US010445884B2

United States Patent
Marks et al.

(10) Patent No.: US 10,445,884 B2
(45) Date of Patent: Oct. 15, 2019

(54) CONTROL DEVICE FOR COMMUNICATING VISUAL INFORMATION

(71) Applicant: Sony Interactive Entertainment Inc., Tokyo (JP)

(72) Inventors: Richard Marks, Pleasanton, CA (US); Anton Mikhailov, Campbell, CA (US); Ennin Huang, Santa Clara, CA (US); Gary M. Zalewski, Oakland, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 159 days.

(21) Appl. No.: 15/792,690

(22) Filed: Oct. 24, 2017

(65) Prior Publication Data

US 2018/0047172 A1 Feb. 15, 2018

Related U.S. Application Data

(63) Continuation of application No. 14/725,260, filed on May 29, 2015, now Pat. No. 9,799,121, which is a
(Continued)

(51) Int. Cl.
*G06T 7/20* (2017.01)
*A63F 13/213* (2014.01)
(Continued)

(52) U.S. Cl.
CPC .............. *G06T 7/20* (2013.01); *A63F 13/211* (2014.09); *A63F 13/213* (2014.09); *A63F 13/216* (2014.09); *A63F 13/219* (2014.09); *A63F 13/22* (2014.09); *A63F 13/235* (2014.09); *A63F 13/24* (2014.09); *A63F 13/25* (2014.09); *A63F 13/28* (2014.09); *A63F 13/825* (2014.09); *G06F 3/016* (2013.01); *G06F 3/017* (2013.01); *G06F 3/0304* (2013.01); *G06F 3/0346* (2013.01);
(Continued)

(58) Field of Classification Search
CPC ........ G06T 7/20; A63F 13/211; A63F 13/213; A63F 13/24
See application file for complete search history.

(56) References Cited

U.S. PATENT DOCUMENTS

2008/0204411 A1 8/2008 Wilson .......................... 345/158

OTHER PUBLICATIONS

European App. No. 09 791 610.0, Communication pursuant to Article 94(3) EPC, dated Oct. 29, 2018.

*Primary Examiner* — David L Lewis
*Assistant Examiner* — Robert E Mosser
(74) *Attorney, Agent, or Firm* — Penilla IP, APC

(57) ABSTRACT

Methods and systems for processing input by a computing device are presented. One method includes operations for receiving images of a control device that includes an object section, and for determining a location of the control device utilizing image analysis for each captured image. Additionally, the movement of the control device is tracked based on the determined locations, where the tracking of the movement includes receiving inertial sensor information obtained by sensors in the control device, and determining an orientation of the control device based on the sensor information. Additionally, the method includes an operation for translating the movement and orientation of the control device into input for a game executing in the computing device, where the input is translated into a motion and orientation of an object in the game based on the movement of the control device.

20 Claims, 32 Drawing Sheets

Related U.S. Application Data continuation of application No. 13/539,292, filed on Jun. 29, 2012, now Pat. No. 9,046,927, which is a continuation of application No. 12/426,186, filed on Apr. 17, 2009, now Pat. No. 8,287,373, and a continuation-in-part of application No. 12/259,181, filed on Oct. 27, 2008, now Pat. No. 10,279,254, which is a continuation-in-part of application No. 11/588,779, filed on Oct. 26, 2006, now Pat. No. 8,062,126.

(60) Provisional application No. 61/120,340, filed on Dec. 5, 2008, provisional application No. 60/730,659, filed on Oct. 26, 2005.

(51) Int. Cl.
*G06F 3/01* (2006.01)
*G06F 3/03* (2006.01)
*G06F 3/0346* (2013.01)
*A63F 13/211* (2014.01)
*A63F 13/219* (2014.01)
*A63F 13/22* (2014.01)
*A63F 13/28* (2014.01)
*A63F 13/216* (2014.01)
*A63F 13/235* (2014.01)
*A63F 13/24* (2014.01)
*A63F 13/25* (2014.01)
*A63F 13/825* (2014.01)
*G06F 3/038* (2013.01)
*G06F 3/0484* (2013.01)

(52) U.S. Cl.
CPC ........ G06F 3/0383 (2013.01); G06F 3/04842 (2013.01); *G06F 2203/013* (2013.01); *G06F 2203/0333* (2013.01); *G06F 2203/0381* (2013.01); *G06F 2203/0383* (2013.01); *G06T 2207/10016* (2013.01); *G06T 2207/10024* (2013.01); *G06T 2207/30241* (2013.01); *G06T 2207/30242* (2013.01)

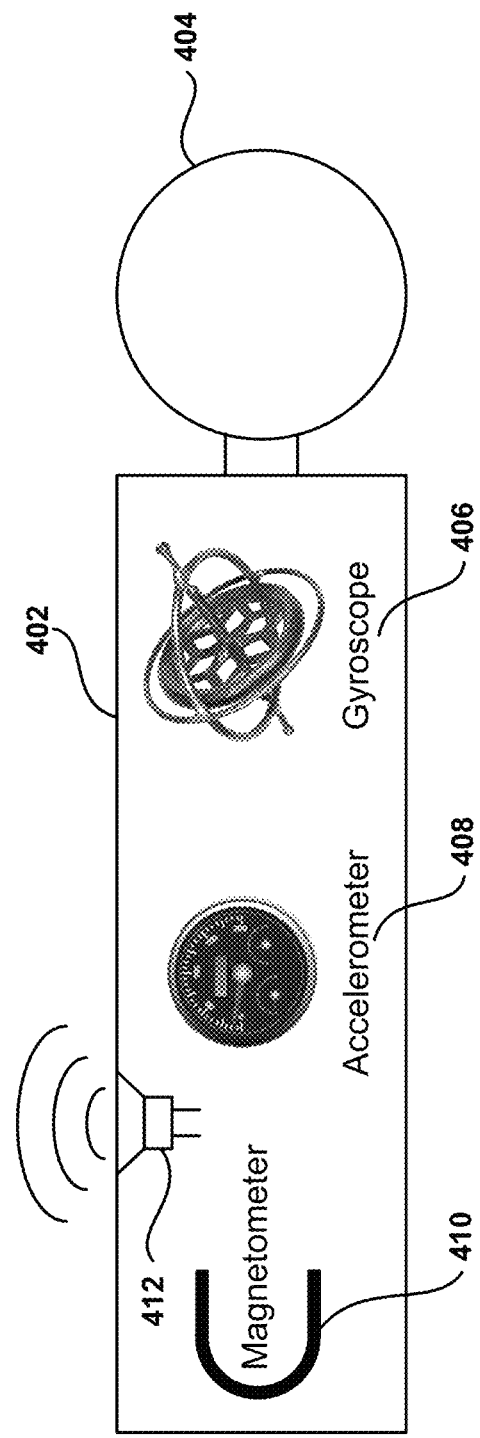

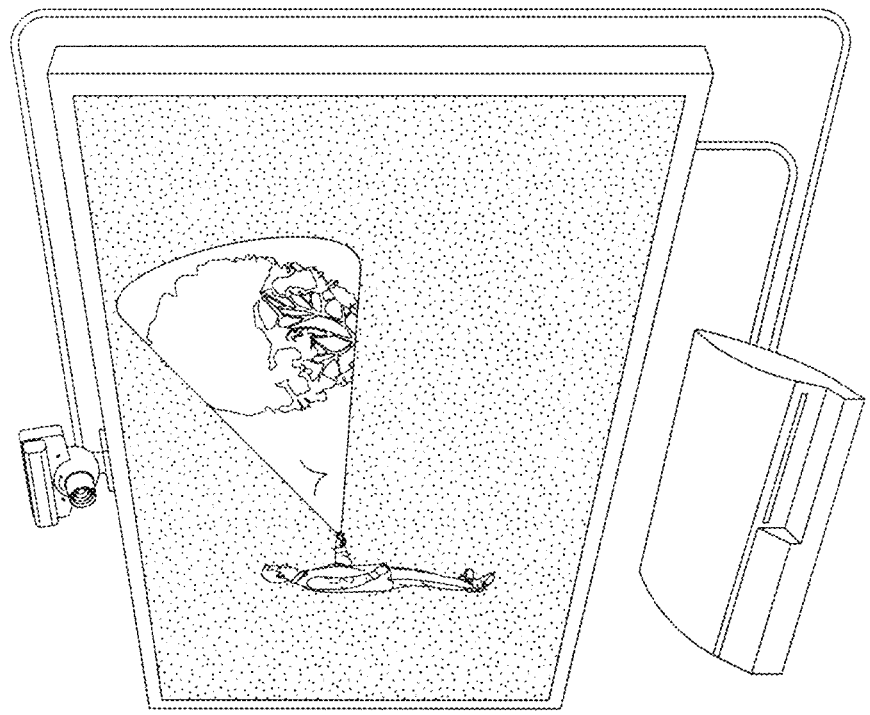
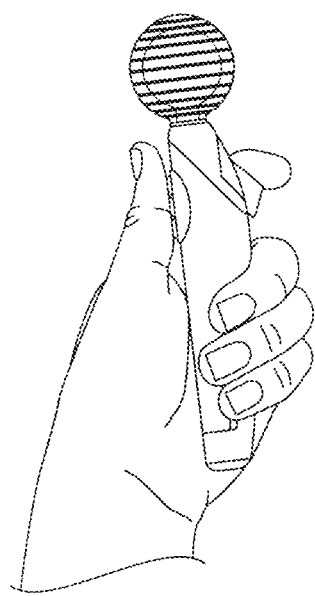
FIG. 7A

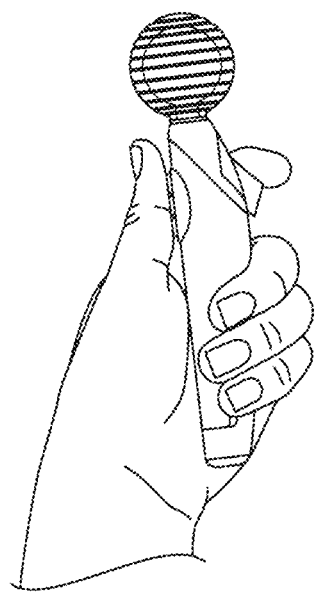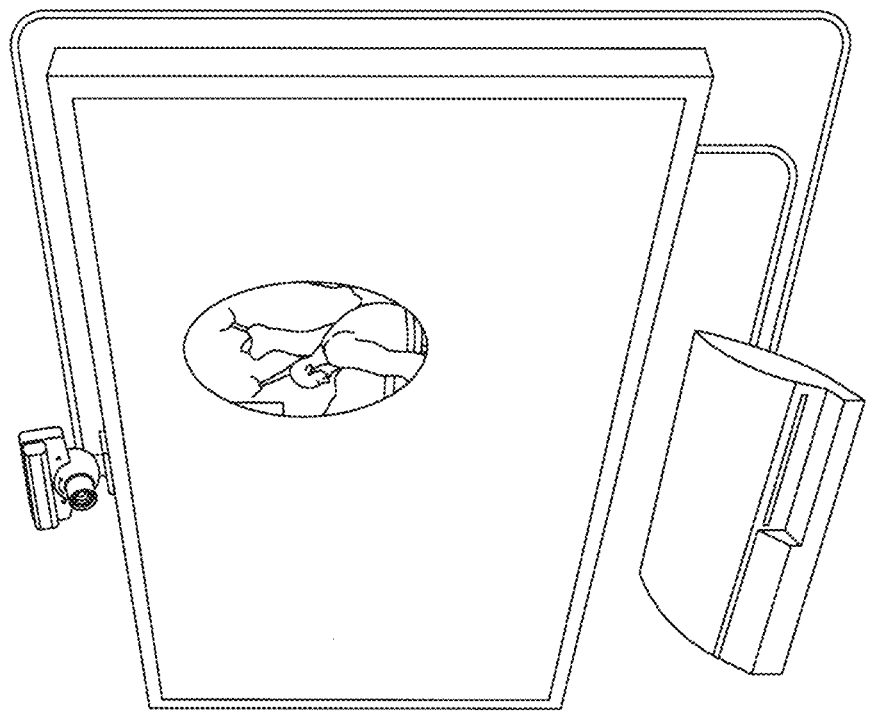
FIG. 7B

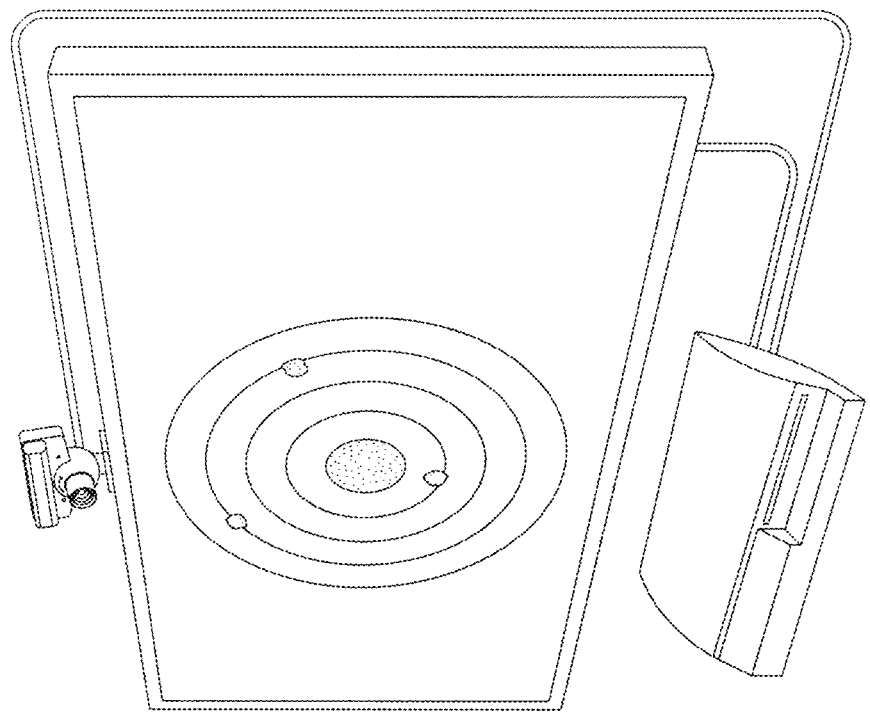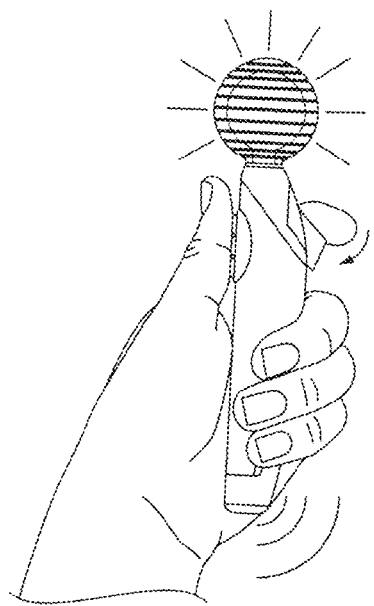
FIG. 8

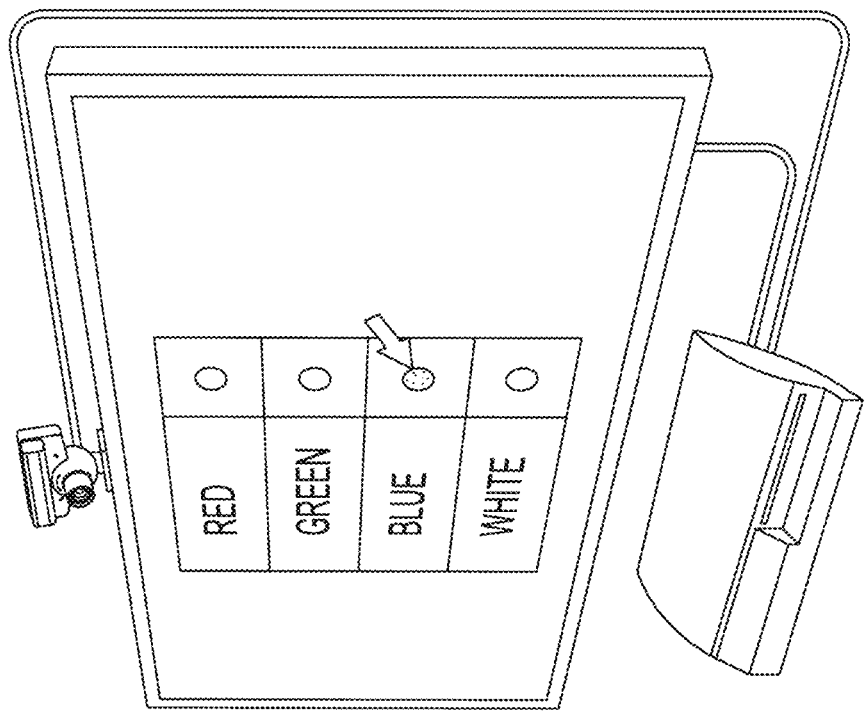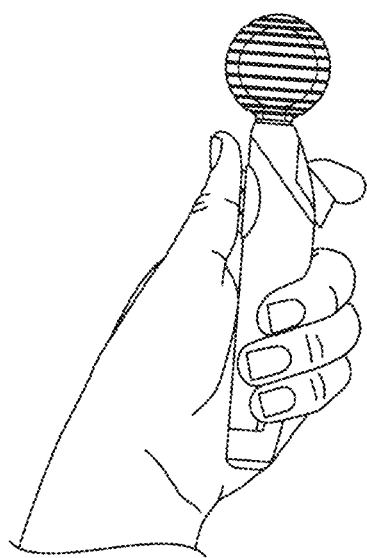
FIG. 9

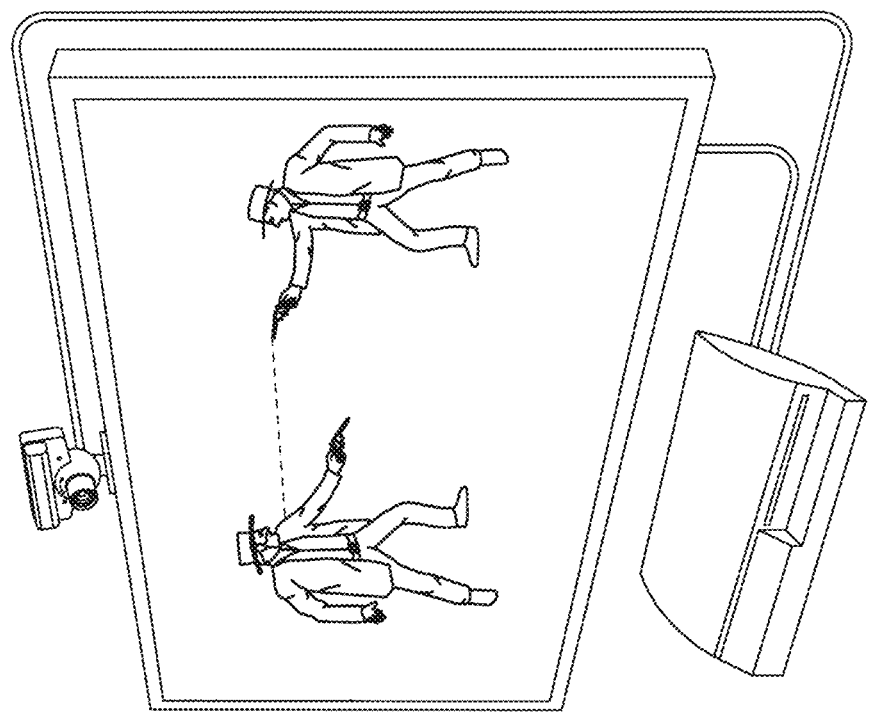
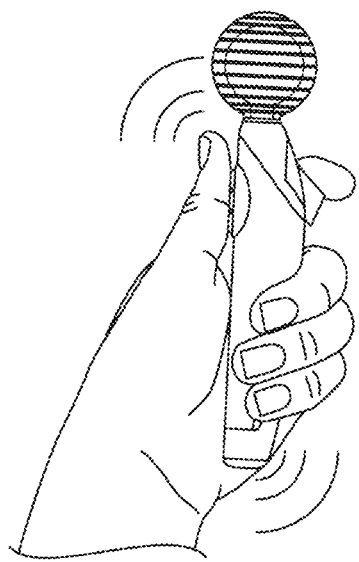
FIG. 10

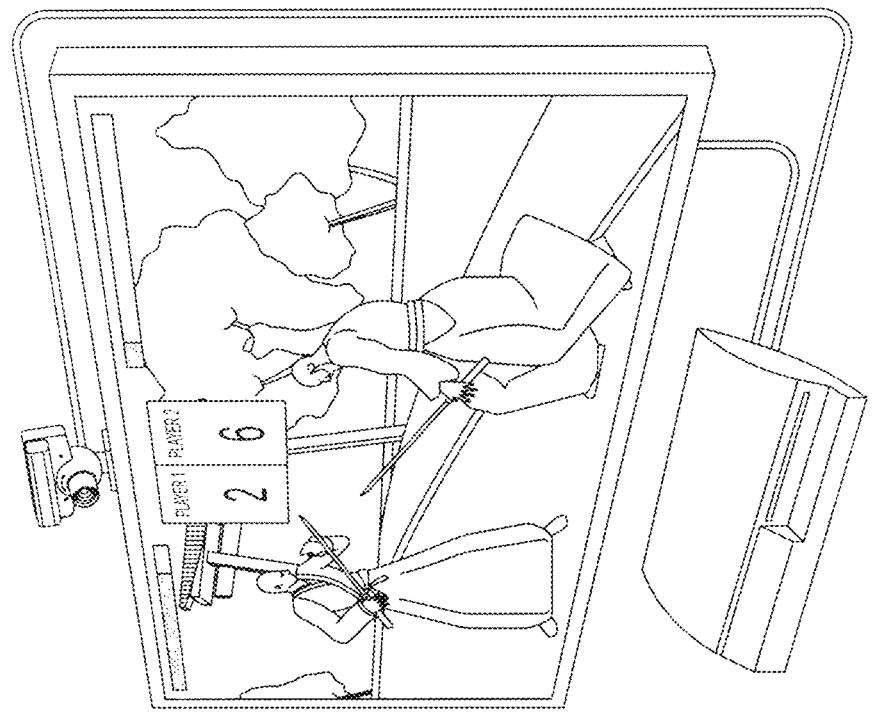
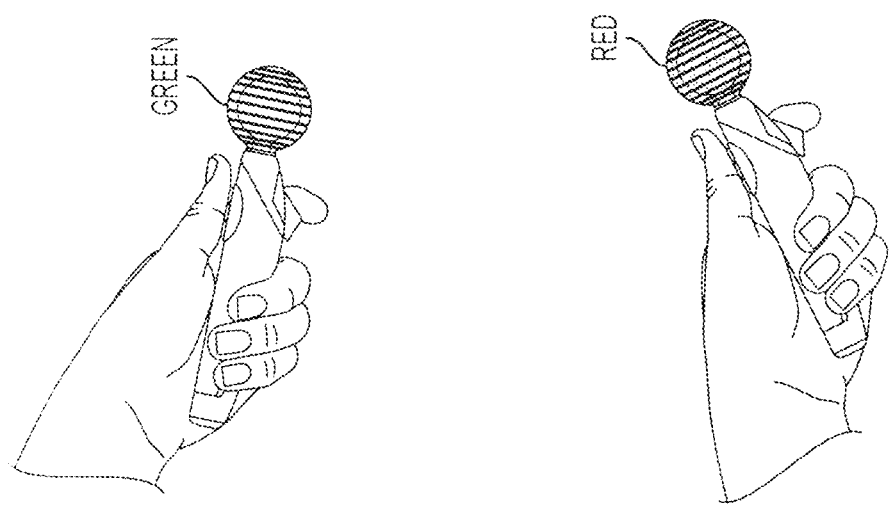
FIG. 11A

CONTROL DEVICE FOR COMMUNICATING VISUAL INFORMATION

CLAIM OF PRIORITY

This application is a Continuation application under 35 USC § 120 of U.S. application Ser. No. 14/725,260, filed on May 29, 2015, (U.S. Pat. No. 9,799,121, issued on Oct. 24, 2017), entitled "CONTROL DEVICE FOR COMMUNICATING VISUAL INFORMATION," which is a further Continuation of U.S. application Ser. No. 13/539,292, filed on Jun. 29, 2012 (U.S. Pat. No. 9,046,927, issued on Jun. 2, 2015), entitled "CONTROL DEVICE FOR COMMUNICATING VISUAL INFORMATION," and are herein incorporated by reference.

Application Ser. No. 13/539,292, entitled "CONTROL DEVICE FOR COMMUNICATING VISUAL INFORMATION," is a Continuation application under 35 USC § 120 and claims priority from U.S. patent application Ser. No. 12/426,186, filed on Apr. 17, 2009 (U.S. Pat. No. 8,287,373, issued on Oct. 16, 2012), and entitled "CONTROL DEVICE FOR COMMUNICATING VISUAL INFORMATION," which claims priority from U.S. Provisional Patent Application No. 61/120,340, filed Dec. 5, 2008, and entitled "CONTROL DEVICE FOR COMMUNICATING VISUAL INFORMATION."

Application Ser. No. 13/539,292, entitled "CONTROL DEVICE FOR COMMUNICATING VISUAL INFORMATION," also claims priority under 35 USC § 120 as a continuation-in-part of U.S. patent application Ser. No. 12/259,181, filed Oct. 27, 2008, and entitled "CONTROLLER HAVING VISUALLY TRACKABLE OBJECT FOR INTERFACING WITH A GAMING SYSTEM," which claims priority under 35 USC § 120 as a continuation-in-part of U.S. application Ser. No. 11/588,779, filed on Oct. 26, 2006 (U.S. Pat. No. 8,062,126, issued on Nov. 22, 2011), entitled "SYSTEM AND METHOD FOR INTERFACING WITH A COMPUTER PROGRAM," which claims priority to U.S. Provisional Patent Application No. 60/730,659, filed on Oct. 26, 2005, entitled "SYSTEM AND METHOD FOR INTERFACING WITH A COMPUTER PROGRAM." All applications listed above are herein incorporated by reference.

CROSS REFERENCE TO RELATED APPLICATIONS

This application is related to U.S. patent application Ser. No. 11/588,779, filed Oct. 26, 2006 (U.S. Pat. No. 8,062,126, issued on Nov. 22, 2011), and entitled, "SYSTEM AND METHOD FOR INTERFACING WITH A COMPUTER PROGRAM"; U.S. patent application Ser. No. 12/145,455, filed Jun. 24, 2008 (U.S. Pat. No. 8,323,106, issued on Dec. 4, 2012), and entitled, "DETERMINATION OF CONTROLLER THREE-DIMENSIONAL LOCATION USING IMAGE ANALYSIS AND ULTRASONIC COMMUNICATION"; U.S. patent application Ser. No. 11/429,133, filed May 4, 2006 (U.S. Pat. No. 7,760,248, issued on Jul. 20, 2010), and entitled "SELECTIVE SOUND SOURCE LISTENING IN CONJUNCTION WITH COMPUTER INTERACTIVE PROCESSING"; and International Application No: PCT/US2006/017483, filed May 4, 2006, and entitled "SELECTIVE SOUND SOURCE LISTENING IN CONJUNCTION WITH COMPUTER INTERACTIVE PROCESSING," all of which are incorporated herein by reference.

BACKGROUND

1. Field of the Invention

The present invention relates to methods and systems for interfacing a control device with a computer device, and more particularly, methods and systems for interfacing a control device with a computer program executing at a base computing device using visual cues.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

It is in this context that embodiments of the invention arise.

SUMMARY

Embodiments of the present invention provide methods and systems for interfacing a control device with a computer program executing at a base computing device. A spherical section of the control device generates visual cues that provide input for the computer program or visual feedback for the user holding the control device. It should be appreciated that the present invention can be implemented in numerous ways, such as a process, an apparatus, a system, a device or a method on a computer readable medium. Several inventive embodiments of the present invention are described below.

In one embodiment, a method generates a visual cue at a spherical section of the control device and captures an image of the visual cue using an image capture device connected to the base computing device. Further, the method determines whether the visual cue is user feedback or input for the computer program, and processes the visual cue at the base computing device when the visual cue is an input. Additionally, a state of an object being processed is updated by the computer program in response to the input to drive interactivity with the computer program via the control device.

In another embodiment, a method generates a visual cue request, the visual cue request being one of user feedback or input for the computing device or both. Further, the method includes producing a feedback visual cue at a spherical section of the control device when the visual cue request is for user feedback, and receiving the input at the base computing device when the visual cue request is for input. The operation of receiving the input includes producing an input visual cue at the spherical section, capturing an image of the visual cue, and processing the image of the visual cue at the base computing device. The image of the visual cue is used to update an object used by the computer program to drive interactions between the control device and the computer program.

In yet another embodiment, a system for using visual cues for user feedback and input to a computer program is presented. The system includes a base computing device, a control device and an image capture device connected to the base computing device. The base computing device has a processor executing the computer program. The control device has a spherical section that generates a visual cue, and the image capture device is used to take pictures of the visual cue. When the program instructions from the computer program are executed by the processor they cause the processor to determine whether the visual cue is user feedback or input for the computer program, and to process the visual cue at the base computing device when the visual cue is an input. Program instructions also cause the processor to update a state of an object being processed by the computer program in response to the input. Updating the object is used to drive interactivity with the computer program via the control device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4 depicts a controller with sensors for improving movement tracking, according to one embodiment.

FIGS. 7A-7B show different embodiments for using a control device to interface with the computing device to emulate a flashlight.

FIG. 8 depicts an embodiment for using the control device in a shooting application.

FIG. 9 illustrates the use of a controller and knowledge of the orientation of the controller to select an item from a menu in a display, according to one embodiment.

FIG. 10 depicts an embodiment for providing user feedback using visual cues generated at the controller.

FIG. 11A-B illustrate embodiments for using visual cues for user feedback.

DETAILED DESCRIPTION

The following embodiments describe methods and apparatus for interfacing a control device with a computer program executing at a base computing device by using visual cues for both user feedback and input to the computer program.

It will be obvious, however, to one skilled in the art, that the present invention may be practiced without some or all of these specific details. In other instances, well known process operations have not been described in detail in order not to unnecessarily obscure the present invention.

Figure 1A:
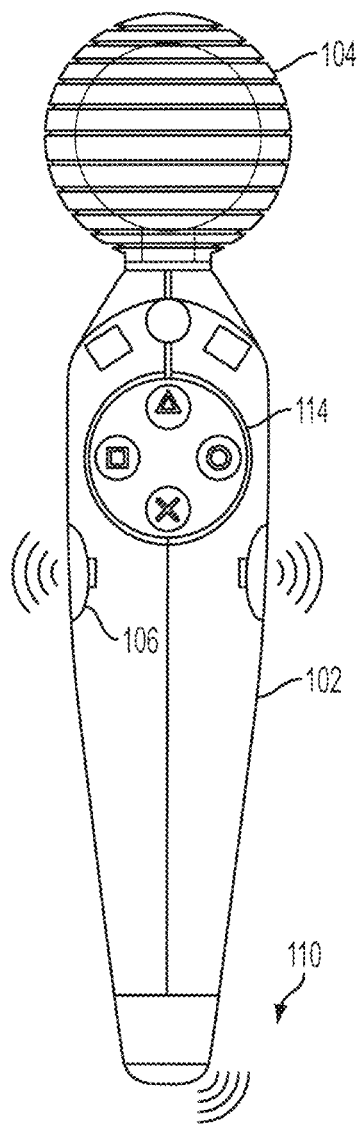
FIGS. 1A-1D depict different embodiments of a ball-attached game controller.
Figure 1B:
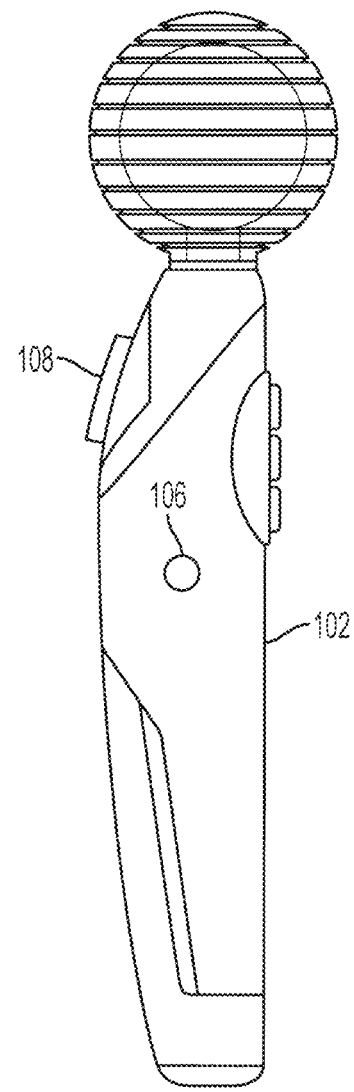

FIGS. 1A-1D depict different embodiments of a ball-attached game controller. FIG. 1A is a front view and FIG. 1B is a side view of controller 102. Spherical section 104 can be illuminated in different ways, such as with different colors, different brightness, and in intermittent fashion. The visual cues generated by spherical section 104 can be used to provide visual feedback to the user holding the controller, and sometimes provide feedback to other users interacting with the user holding the controller. The visual cues can also provide visual input to the base device via an image capture device that takes images of the area around controller 102. In one embodiment, input can be provided via buttons pad 114 on the frontal surface of controller 102, or via bottom button 108. Buttons pad 114 can be configured for action buttons or as a directional pad. Bottom button 108 can be used in applications such as firing, picking up an object, turning on or off a flashlight, etc. Speaker 106 generates audio signals, and vibration device 110 provides vibrotactile feedback to the user.

Figure 1C:
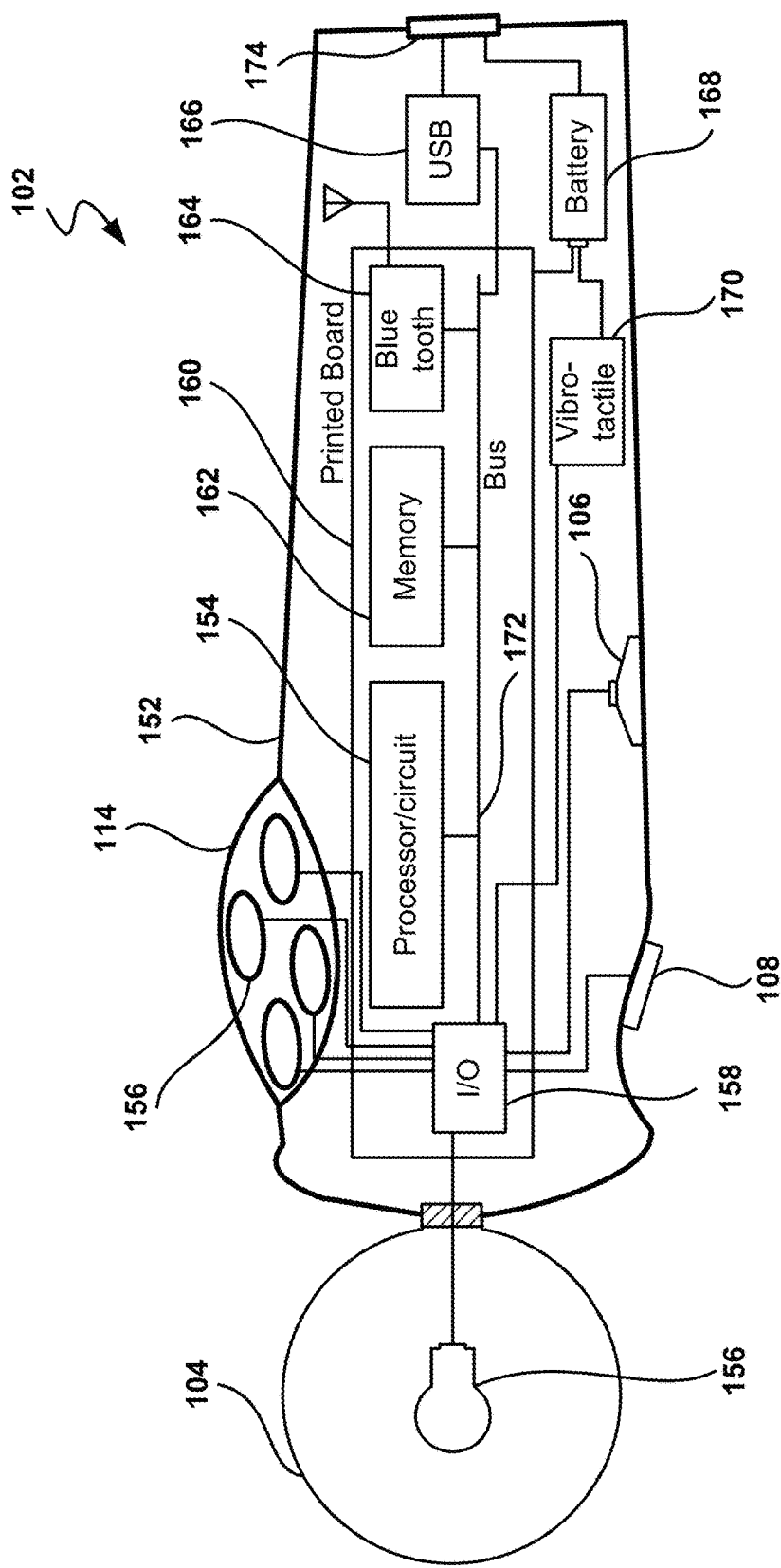

FIG. 1C illustrates example components of controller 102. Although controllers defined within the spirit and scope of the claims may have more or less components, these exemplary components show example electronics, hardware, firmware, and housing structure to define an operable example These example components, however, should not limit the claimed inventions, as more or fewer components are possible. With this in mind, the controller includes body 152 (that is hand-held) and spherical section 104, also referred to herein as a ball. Body 152 is configured to provide a handle to operate controller 102 with a single hand. A user's second hand may, of course, be used to hold or select buttons on body 152. A user holding controller 102 can provide input by pressing buttons, such as top button 156 and bottom button 108, and by moving the controller within a three-dimensional space. Controller 102 is configured to operate wirelessly, which facilitates freedom of controller movement in order to interact with the base station device. Wireless communication can be achieved in multiple ways, such as via Bluetooth® wireless link, WiFi, infrared (not shown) link, or visually by capturing images of the device by a camera attached to the base computing device.

Visual communication is enhanced by the relatively large ball 104 facing the camera and that can be illuminated to improve visual recognition. Using a spherical section improves visual recognition as the ball is always perceived as a circle (or partial circle) in a captured image, independent of the orientation of the controller. In one embodiment, the ratio of the ball's diameter to the size of the largest diameter of a cross section of handle 152 is about 1, but other ratios are also possible, such as 1.2, 1.4, 0.9, 0.8, etc. Because the ball is connected to body 152, a section of the ball is occluded from view by handle 152. In one embodiment, the surface of ball 104 is 90 percent visible, but other visibility percentages are also possible, such as 99% (the lollipop), 85%, 80%, 75%, etc. In general, it is desired that the ball is visible by the camera, and the visible surface appears to have some curvature (e.g., spherical curvature).

Ball 104 is illuminated by light emitting device 156. In one embodiment, light emitting device 156 can emit light of a single color, and in another embodiment, light emitting device 156 can be configure to emit light from a choice of colors. In yet another embodiment, ball 104 includes several light emitting devices, each device being capable of emitting light of one color. Light emitting device 156 is configurable to emit different levels of brightness. The base computing device can provide interactivity to the user holding the controller by changing the light emitting status of ball 104, producing audio signals, or with vibrotactile feedback, etc. One or a combination of these feedback operations are possible. In one embodiment, the type of feedback is selected from a list of predefined interactivity, and based on what is occurring in a game. In one embodiment, the light emitting devices are light emitting diodes (LEDs).

The visual cues generated by ball 104 can be used to provide visual input to the base computing device or to provide feedback to the user or both. Additionally, the visual cues can be generated upon a command transmitted from the base station or upon the occurrence of a preconfigured condition detected at controller 102, such as pressing a button or jerking the controller at great speed. The difference combinations of visual cue generation and purpose can place the controller in different modes. In one mode, the base computing device sends a command to the controller to set the light emitted by ball 104 in a desired state (such as lighting up green), and then the base computing device proceeds to visually track the controller. In a second mode, the base computing device sends a command to the controller to create a visual cue every time a desired event takes place, such as pressing a button to simulate firing. The base computing device can then track the visual state of the controller and detect the event at the controller by analyzing the images taken of the controller. In this mode, the visual cue can also provide feedback to the user, such as flashing a light when the button gets pushed.

In yet another mode, the primary purpose of the visual cues is to provide feedback to the user, such as for example lighting up the ball in a color indicative of a state of the game played. See below the description with reference to FIGS. 6A-B for one example of a display painting application. It should be noted that even when the purpose of the visual cue is to provide user feedback, the base computing device can also use the cues for input, such as tracking visually ball 104 because the base computing device knows the color of the visual cue, or is able to monitor different visual cues that can be produced at any time by the ball.

Inside body 152, printed circuit board 160 holds processor 154, Input/Output (I/O) module 158, memory 162, WiFi module 178, and Bluetooth module 164, interconnected by bus 172. A Universal Serial Bus (USB) module 166 also provides interactivity with the base computing device, or other devices connected to USB port 174. The USB port can also be used to charge the rechargeable battery 168. Vibrotactile feedback is provided by vibrotactile module 170.

Note that the above controller configuration and methods of operation are exemplary and many modifications thereto, including reordering some elements and/or performing some operations in parallel, would occur to a person of ordinary skill in the art with access to the present Specification, and is well within the scope of the claimed invention. For example, controller 102 can also include sensors for mechanical tracking of the controller movement, as described below in reference to FIG. 4.

Figure 1D:
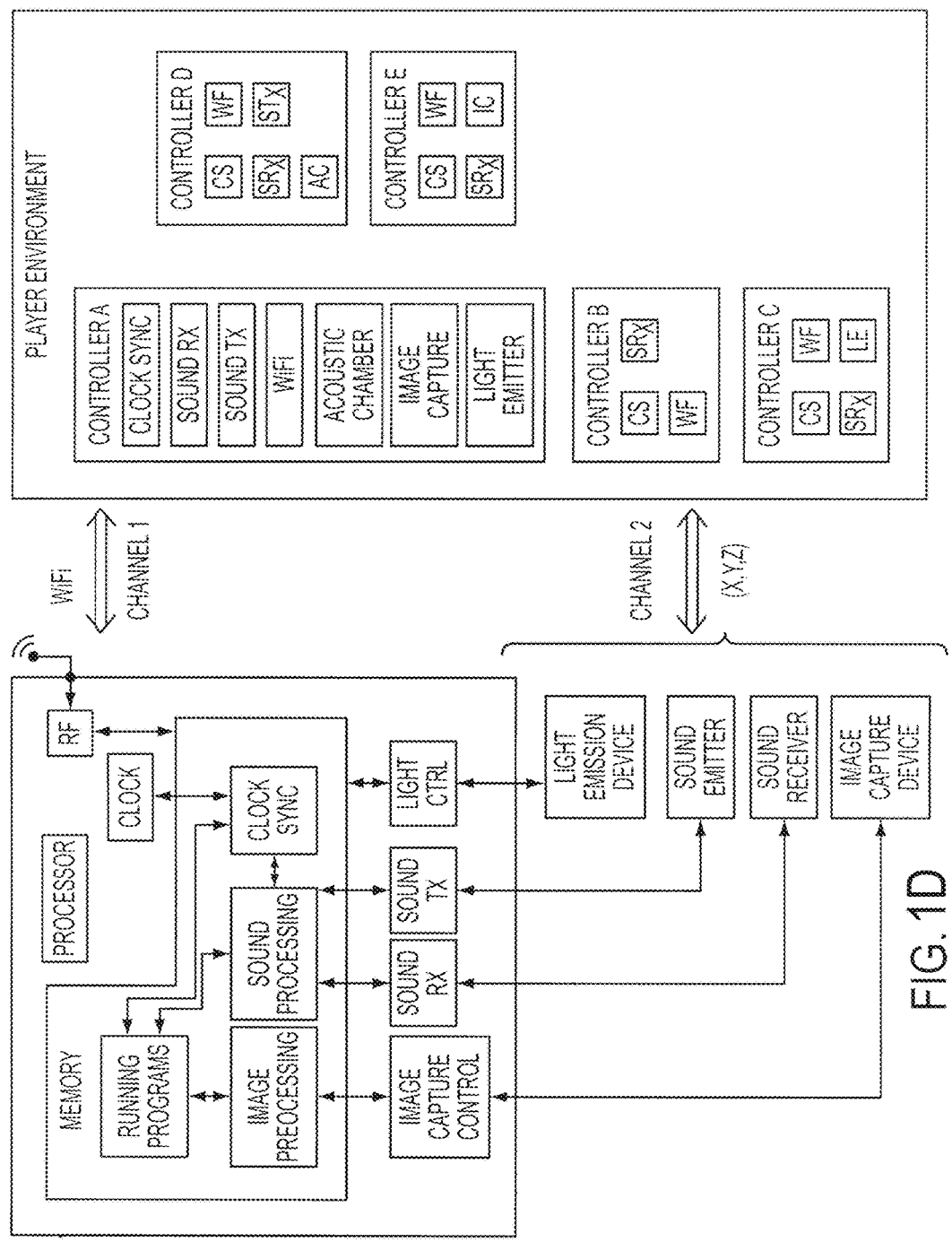

FIG. 1D is a block diagram of the different elements in the entertainment system. The base computing system and its components are located on the left side of FIG. 1D, and the player environment is shown on the right side. The base computing system includes a processor, a memory area, a clock, and communication interfaces. The communication interfaces include a radio-frequency (RF) interface for wireless communications to the controllers, such as communications using the WiFi™ protocol. Other communications methods include image capturing, sound transmission and reception (ultrasonic in this embodiment), and light emitters.

The different communication devices connected to the base computing system connect to the respective controllers inside the computing system. The memory area includes running programs, an image processing area, a sound processing area, and a clock synchronization area. Running programs include a gaming program, image processing program, sound processing program, clock synchronization program, etc. These programs use the corresponding areas of memory, such as the image processing area containing image data, the sound processing area containing ultrasound communications data, and the clock synchronization area used for the synchronization with remote devices.

Several embodiments for controller configuration are shown in the player environment area. Controller A represents a "fully loaded" controller with many of the features previously described. Controller A includes a Clock Synchronization (CS) module used for clock synchronization with the base computing system; a Sound Receiver (SRx) for receiving ultrasonic data; a Sound Transmitter (SRx) for sending ultrasonic data; a WiFi (WF) module for WiFi communications with computing system 700; an Acoustic Chamber (AC) for conducting sound to and from the front and/or the sides of the controller; an Image Capture (IC) device, such as a digital video camera, for capturing image data; and a Light Emitter (LE) in the infrared or visible spectrum for easier image recognition from the image processing module at computing system 700.

Additionally, controller A includes a spherical section (not shown), to improve image recognition by a remote capture device. The spherical section includes retroreflective material that increases the amount of light, sent by a light emitter next to the image capture device, reflected back towards the image capture device. The light created by the light emitter can be in the infrared or the visible spectrum, therefore the image capture device will work in the same light spectrum. The different components in Controller A can be implemented as separate devices or modules inside Controller A. In another embodiment, the different components in Controller A are grouped into a smaller number of integrated components enabling a more compact implementation. The various controllers can also include one or more USB plugs, to enable charging of the controllers when connected to the game station or a computer.

According to the intended use of a given controller, simpler configurations can be used with less features than those described for controller A. Some embodiments of simpler devices are shown with respect to controllers B-E utilizing a subset of features from those described for controller A. The person skilled in the art will readily appreciate that similar configurations are possible within the spirit of the invention by adding or subtracting components, as long as the principles of the invention are maintained.

Figure 2D:
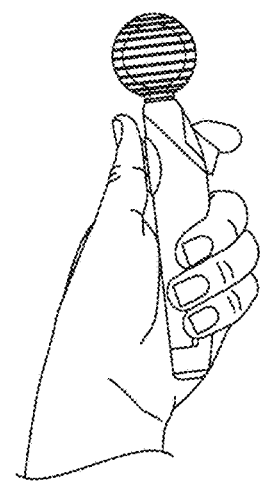
FIGS. 2A-2D depict different operational modes for the game controller of FIGS. 1A-B.
Figure 2C:
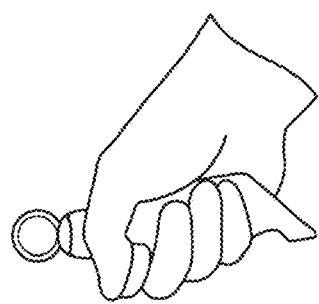
Figure 2B:
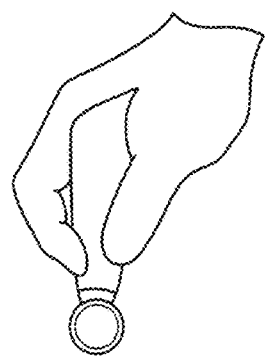
Figure 2A:
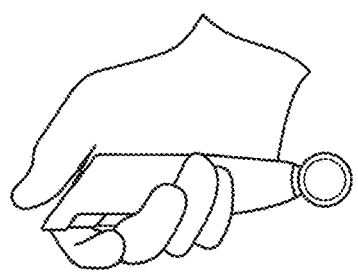

FIGS. 2A-2D depict different operational modes for the game controller of FIGS. 1A-B. FIG. 2A shows a "reverse wand" operation, where the ball section is located at the bottom of the controller, and the top includes input buttons. In this configuration, the controller can be used as an arcade flight stick by pivoting on the sphere. In one embodiment, an inertial unit provides the angle of the "stick" (controller) and the twist, and the top surface includes a directional pad. This mode of operation can be used in firing, driving, flying games, etc. In one embodiment, the controller includes buttons for the index and middle finger in the reverse wand configuration. As a result, two reverse wand controllers provide the same functionality as a Sony DualShock®2 controller from Sony Computer Entertainment America Inc.

FIG. 2B shows a controller behind held in a "pencil" configuration. The ball faces the camera for visual identification, and buttons in the body of the controller enable user input. This mode can be use in games where the controller is a paint brush, a flashlight, a pointer, a firing weapon, etc. FIG. 2C illustrate the use of a controller in wand mode. In one embodiment, the wand includes two thumb buttons at the top of the handle and a trigger for the index finger, but other configurations are also possible. The wand mode can be used as a magic-wand, a music director's baton, a tennis racket, a hatchet or similar weapon, a tool such as a pick, an umbrella, a rope, etc.

FIG. 2D shows a controller in a second wand mode, where the thumb is placed on top of the controller, possibly to activate input buttons. The index finger is placed at the bottom of the controller and can also press a button, in this case a "firing" button, that can be used on other applications beside firing. This second wand mode can be used as a flashlight, a firing weapon, a pointer into the display for menu selection, etc.

Figure 3:
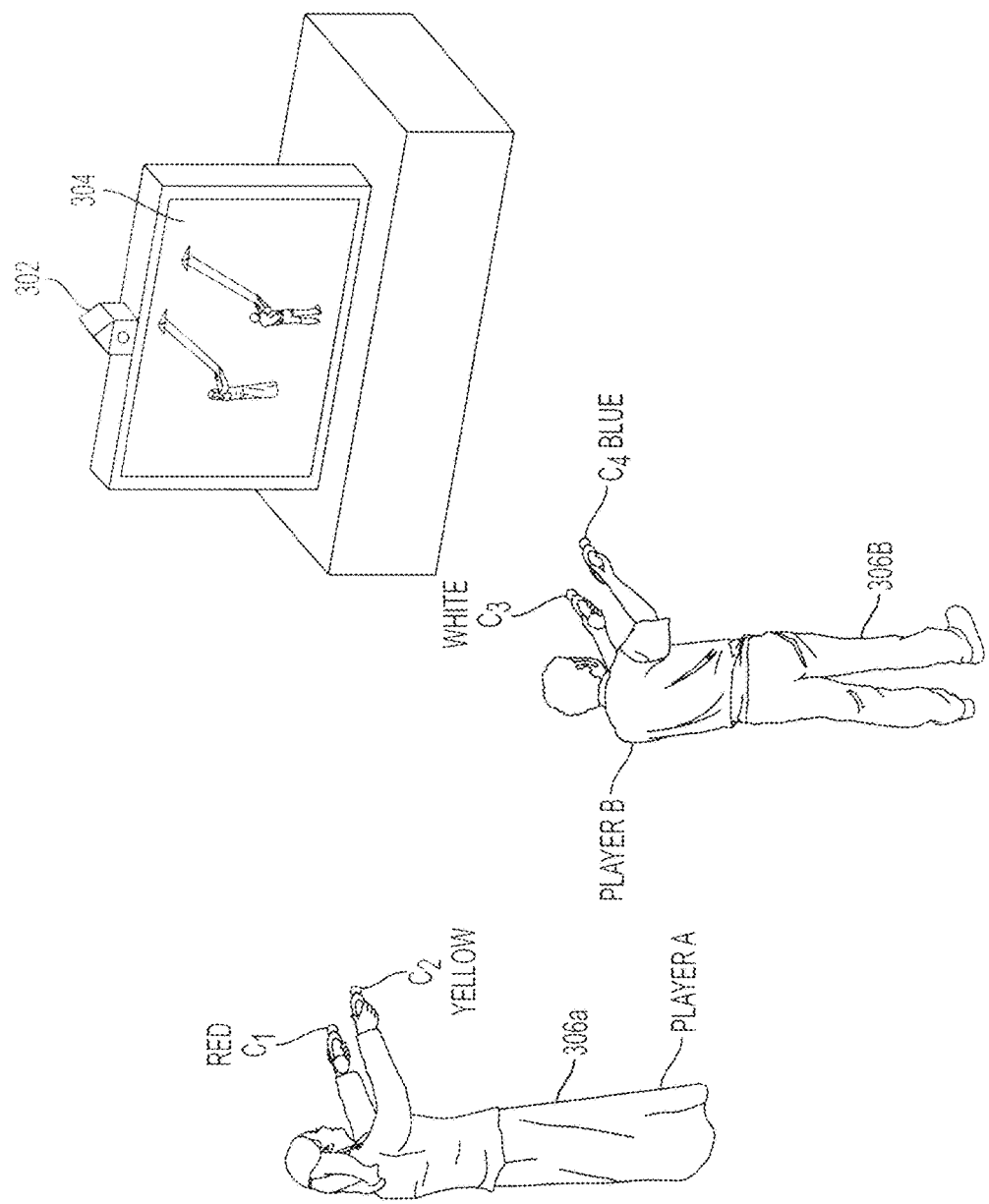
FIG. 3 shows a schematic diagram of a multiplayer environment and the use of visual information to determine the location of the controllers, according to one embodiment.

FIG. 3 shows a schematic diagram of a multiplayer environment and the use of visual information to determine the location of the controllers, according to one embodiment. Image capture device 302 obtains an image of the playing field that includes players A and B 306A-B. The image is analyzed to obtain the location of ball-attached controllers C1, C2, C3 and C4, whose inputs translate into actions of avatars 310a and 310b in the display. In one embodiment, the four controllers have spherical sections, sometimes referred to as "balls," that can be illuminated with different colors that enable visual differentiation of the controllers. For example, controller C1 lights up as red, C2 as yellow, C3 as white, and C4 as blue. This color selection is exemplary, and many other color combinations are possible. In one embodiment, the movement of the controllers is used for playing a game where players fly a virtual kite, but many other applications are possible, such as karate fighting, firing, sword fighting, virtual worlds, etc.

In some embodiments, the light in the controller is used to provide feedback to the user, such as being when the player is "hit," to indicate the amount of life left, to flag when the controller is occluded from view of the camera, etc. The two modes, providing visual input via camera pictures and providing user feedback, can be used simultaneously. In one embodiment, each time the ball is lit to provide user feedback, the base station uses the information associated with lighting the ball in the controller to analyze an image taken by image capture device 302 searching for the color associated with the lighting of the ball. For example, in one mode of operation, when a player pushes a button on the controller then the controller responds by lighting up the ball. The base station monitors the visual status of the ball and when the base station detects that the ball has lighted up, then the base station will process this event to indicate that the player pushed the button.

FIG. 4 depicts a controller with sensors for improving movement tracking, according to one embodiment. Different embodiments include different combinations of sensors, such as magnetometers, accelerometers, gyroscopes, etc. An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers are used to provide the direction of gravity, which gives an absolute reference for 2 angles (world-space pitch and world-space roll). Controllers can suffer accelerations exceeding 5 g, therefore accelerometers able to operate with forces exceeding 5 g are used inside controller 402.

A magnetometer measures the strength and direction of the magnetic field in the vicinity of the controller. In one embodiment, three magnetometers 410 are used within the controller, ensuring an absolute reference for the world-space yaw angle. The magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from the gyros (see below) or the camera. In one embodiment, accelerometer 408 is used together with magnetometer 410 to obtain the inclination and azimuth of the controller.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires, resetting the gyroscopes periodically, which can be done using other available information, such as visual tracking of ball 404, accelerometer, magnetometer, etc. A hand-held device can rotate faster than 500 degrees/sec, so a gyroscopes with an spec of more than 1000 degrees/sec is recommended, but smaller values are also possible.

The information from the different sources can be combined for improved location and orientation detection. For example, if the ball disappears from view, the accelerometer's orientation sensing is used to detect that the controller is facing away from the camera. In one embodiment, controller 402 includes speaker 412 to provide audio feedback to the player. The controller can produce a beep when the ball is not visible, prompting the player to orientate the controller in the right direction or to come back into the field of play.

Figure 5A:
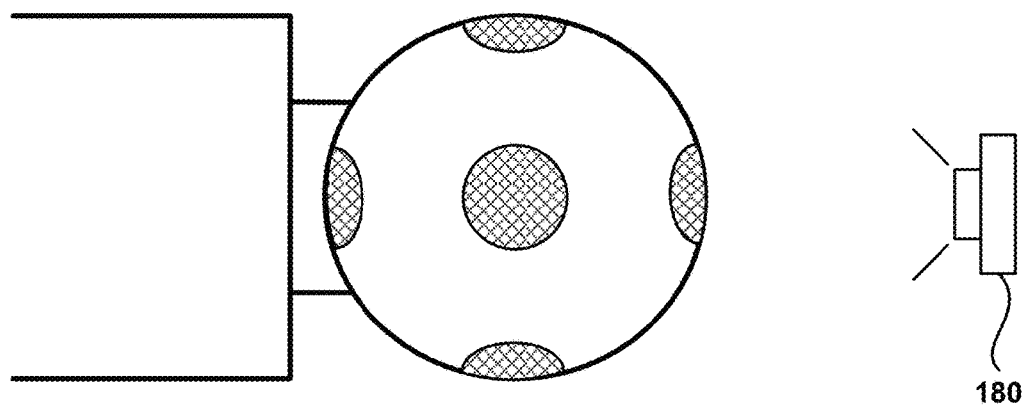
FIGS. 5A-5D depict different embodiments for generating visual cues at the controller.

FIGS. 5A-5D depict different embodiments for generating visual cues at the controller. In one embodiment, the whole ball is illuminated. In the embodiment of FIG. 5A, the ball includes several spherical caps that can be illuminated. The spherical caps can all be illuminated at the same time in the same manner, or can be illuminated independently, at different times, with different colors, and with different brightness. For example, the spherical caps can be illuminated to indicate how much of a resource, such as life, is available. Initially, all the spherical caps are illuminated to be turned off sequentially as the resource diminishes, or viceversa, starting with no caps illuminated to be illuminated in sequence until a goal is reached where all the caps would be illuminated. In one embodiment, the complete ball can also be illuminated together with the spherical caps.

Figure 5B:
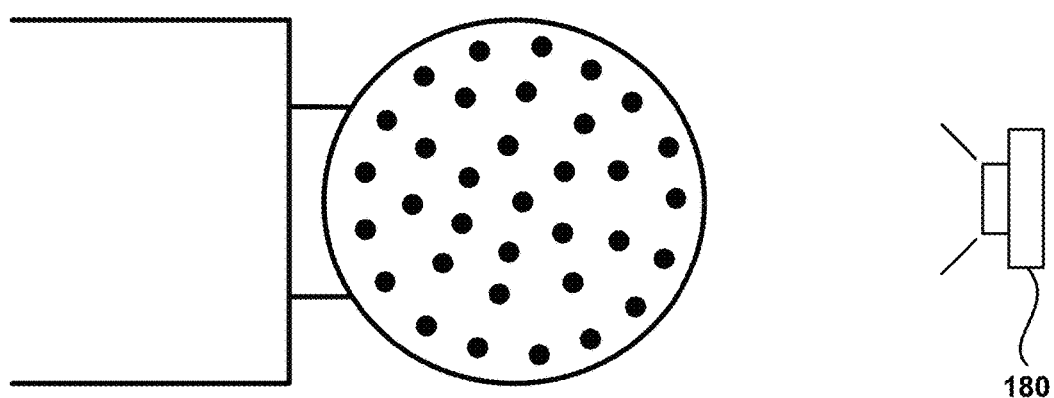
Figure 5C:
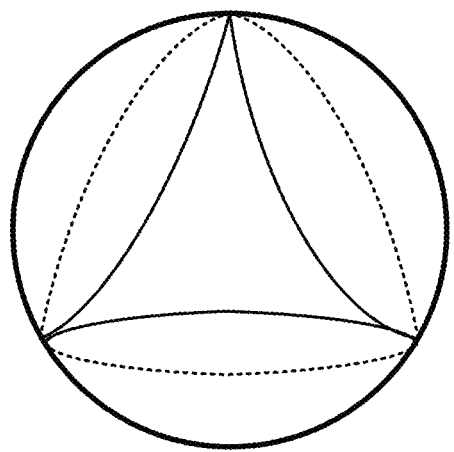
Figure 5D:
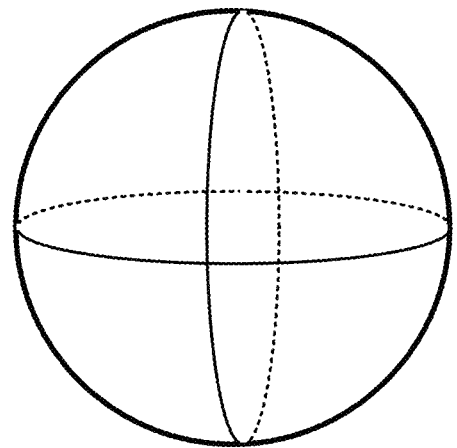

The concept of spherical cap can be extended to a plurality of "dots," or very small spherical caps, as seen in FIG. 5B. In one embodiment, the dots correspond to end of fiber glass fibers carrying light signals. In yet another embodiment, the ball includes different illuminated patterns, such as the three rings in FIG. 5C. FIG. 5D shows a ball with two rings perpendicular to each other. In another embodiment, the ring is not completely illuminated because the part of the ring facing the controller would rarely be captured by the camera, resulting in savings in manufacturing of the ring, as well as in battery consumption. In one embodiment, the ring is only illuminated along a 270 degrees arc of the ring, but other values are also possible.

Figure 6A:
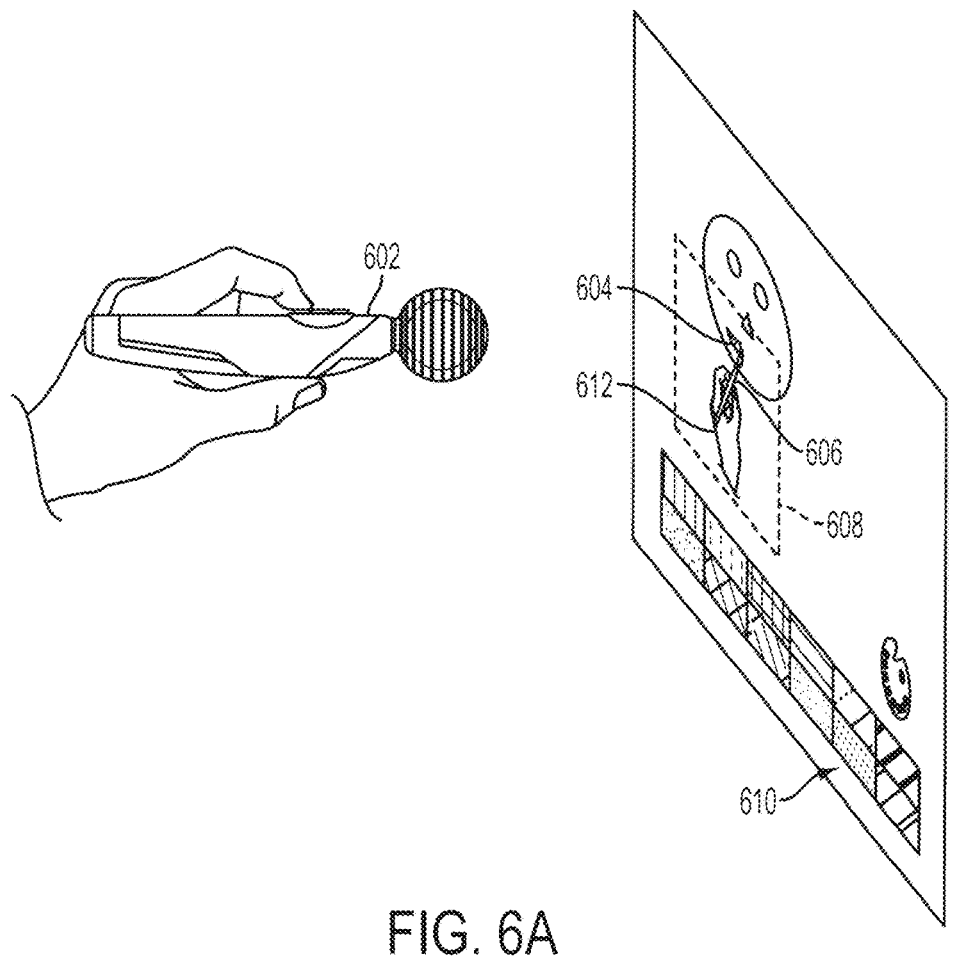
FIGS. 6A-6B depict an embodiment for using a control device as a pointer in a drawing application.
Figure 6B:
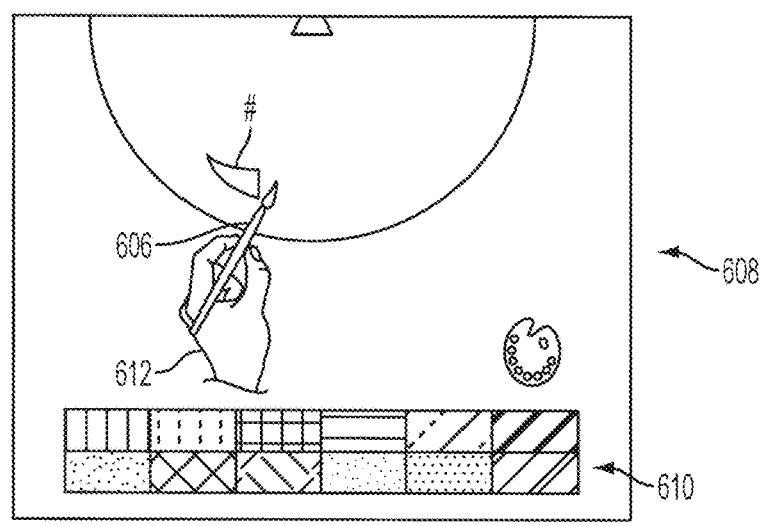

FIGS. 6A-6B depict an embodiment for using a control device as a pointer in a drawing application. The orientation of controller 602 is computed by the base station which enables to use controller 602 as a pointing device. In the embodiment shown in FIGS. 6A-B, a user aims controller 602 towards color palette 610 in the display and selects a color for painting by pressing an input button when the cursor points to the desired color. Once a color is selected, the ball in controller 602 is illuminated with the selected color.

User then moves the pointer to a drawing area in the display where the cursor becomes paintbrush 606 held by virtual hand 612, but other cursor representations are also possible. When a button is pressed in the controller object 604 is drawn with a line of the color selected. A separate area of the display can be configured to provide other inputs, such as selecting the drawing object (line, circle, rectangle, eraser, etc.), the thickness of the drawing object, etc.

A zoom option is available in one embodiment. When user selects zoom area 608 in FIG. 6A, a sub-region of the drawing canvas is shown on the display, as seen in FIG. 6B. In one embodiment, cursor 606 and hand 612 are magnified in zoomed-in view to provide a natural look and feel for the user. In other embodiment, the size of the cursor does not change in the magnified view.

FIGS. 7A-7B show different embodiments for using a control device to interface with the computing device to emulate a flashlight. FIG. 7A depicts the use of a controller with a spherical section interfacing with an application that processes the controller inputs to control the movements of an avatar that holds a flashlight. That is, the player holding the controller operates the controller as a flashlight and the avatar operates the flashlight corresponding with the player moves. As the avatar moves the flashlight, different areas of the display are "illuminated" to disclose their content.

The base computing device interfacing with the controller uses image recognition of the spherical section together with sensors in the controller, such as for example the previously described method with reference to FIG. 4, to determine the orientation of the controller that allows the base computing device to use the controller as a pointing device.

FIG. 7B uses the perceived orientation of the controller as described with reference to FIG. 7A, but the effect on the display differs in that the controller is used as a simulated flashlight that "illuminates" a section of the display as the player points the controller directly to different parts of the display. It should be appreciated that the embodiments illustrated in FIGS. 7A and 7B are exemplary uses of the controller as a pointing device. Other embodiments may utilize different processing of the perceived orientation of the controller, or use the pointing properties of the controller for other purposes. The embodiments illustrated in FIGS. 7A and 7B applied to a flashlight application should therefore not be interpreted to be exclusive or limiting, but rather exemplary or illustrative. For example, the orientation of the controller can be used in applications such as menu selection, shooting, item collection, fighting, etc. One such example is presented in FIG. 8 that depicts an embodiment for using the control device in a shooting application.

The display presents a shooting target and the controller includes a firing button at the bottom to be operated with the index finger, but other button configurations are also possible. In use, the player aims to the target and "fires" by pressing the firing button. The base computer device uses the perceived position and orientation of the controller to estimate the impact of the virtual bullet on the display. In one embodiment, the display presents crosshairs to help the user increase the accuracy of the shots.

In one embodiment, a calibration procedure is performed previously to the firing to estimate the relative position of the controller with respect to the display. See below different embodiments for calibrating the controller described with reference to FIGS. 14, and 16D-E.

FIG. 9 illustrates the use of a controller and knowledge of the orientation of the controller to select an item from a menu in a display, according to one embodiment. A set of options are presented to the user in the display, in this case a set of possible colors, and the user uses the pointing capabilities of the controller to move a cursor in the display and select the desired option, such as a color for illuminating the spherical section of the controller. This can be used in multi-player environments to let the users choose different colors that enable the base computing device to differentiate the controllers visually and, optionally, to assign the color to some object of the display that represents the corresponding user.

In another embodiment, color selection is used during calibration procedures. In one calibration procedure, the user selects a color for calibration, the ball in the controller is illuminated with the selected color, an image is taken of the controller, and the image is analyzed to determine how the selected color is perceived by the image capture device. The process can be repeated by selecting different colors and calibrating the selected colors in similar fashion.

Visual feedback generated by the controller, such as illuminating the spherical section of the controller, can be used in multiple ways. FIG. 10 depicts an embodiment for providing user feedback using visual cues generated at the controller. In a fighting game, a fighter on the screen gets shot or injured, causing the controller ball to be illuminated in a predetermined color, such as red, for a certain period, such as 1 second, but other values are also possible. In another embodiment, a reverse process takes place where the controller is illuminated until the player gets injured or shot, causing the ball to turn off illumination for a period of time. In yet another embodiment, the visual feedback is combined with other forms of feedback, such as making the controller vibrate or produce sound.

It should be noted that the use of illumination for user feedback presented is exemplary, and many other combinations are possible. In one embodiment, the illumination can be intermittent at certain times and the frequency of the intermittent lighting of the ball can be used as feedback, but many other forms of feedback are possible according to the intended effect.

Figure 11B:
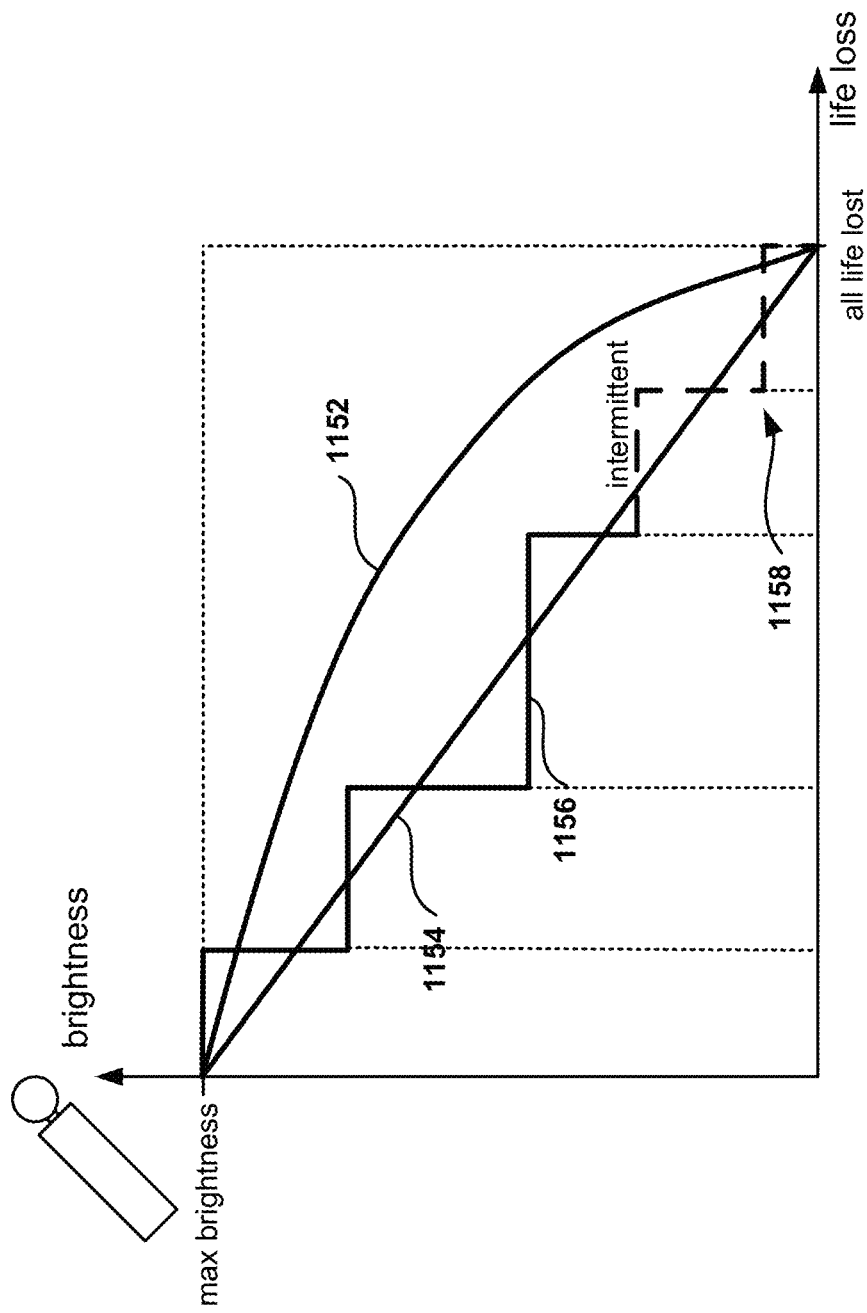

FIG. 11A-B illustrate embodiments for using visual cues for user feedback. FIG. 11A illustrates using visual cues for user feedback to a pair of users simultaneously, according to one embodiment. Initially, both users have "full life" or a predetermined amount of energy, or some other similar player related object whose value changes during play. "Full life" is assigned a ball color, such as green. As a player life diminishes, the color of the ball changes until life is completely lost. A sample color sequence can be green, yellow, orange and red, but other sequences are also possible.

Other embodiments use brightness of the spherical section as feedback, such as for example dimming the intensity of the light emitted by the ball until "life" is exhausted where the ball would not emit light. In this case, since brightness represents the amount of life, it is possible to use different colors at the controller for each player.

FIG. 11B provides a chart for representing different methods to use brightness for user feedback. Initially, a maximum amount of brightness is used to represent an initial object, such as life left by the player's character in the game. As the value of the object decreases, such as decreasing the amount of life left, the brightness decreases. Line 1154 depicts an embodiment where the brightness decreases in linear fashion between the initial and the final values. Curve 1152 depicts an embodiment where the brightness changes are more accentuated when the player is getting closer to losing all life. Step curve 1156 corresponds to an embodiment where the brightness changes in incremental values determined by boundaries in the amount of life left. Using incremental values makes the changes in brightness more accentuated making them more noticeable to the user. In another embodiment, the brightness of the ball can be adjusted to generate a flare effect at the ball.

Some embodiments combine brightness with other forms of feedback, such as ball color or intermittent lighting. In section 1158 of step curve 1156, represented as a dashed line, the ball flashes to further convey the user that there is little life left. Other combinations will be readily appreciated by the person skilled in the art in possession of this application, such as reversing the brightness process where the user would start with a low brightness value that would increase to a high brightness value when all life is lost. It should also be noted that using the spherical section for user feedback can be combined with controller visual location determination by using the current status of user feedback when locating the ball on a captured image of the controller and surrounding area.

Figure 12:
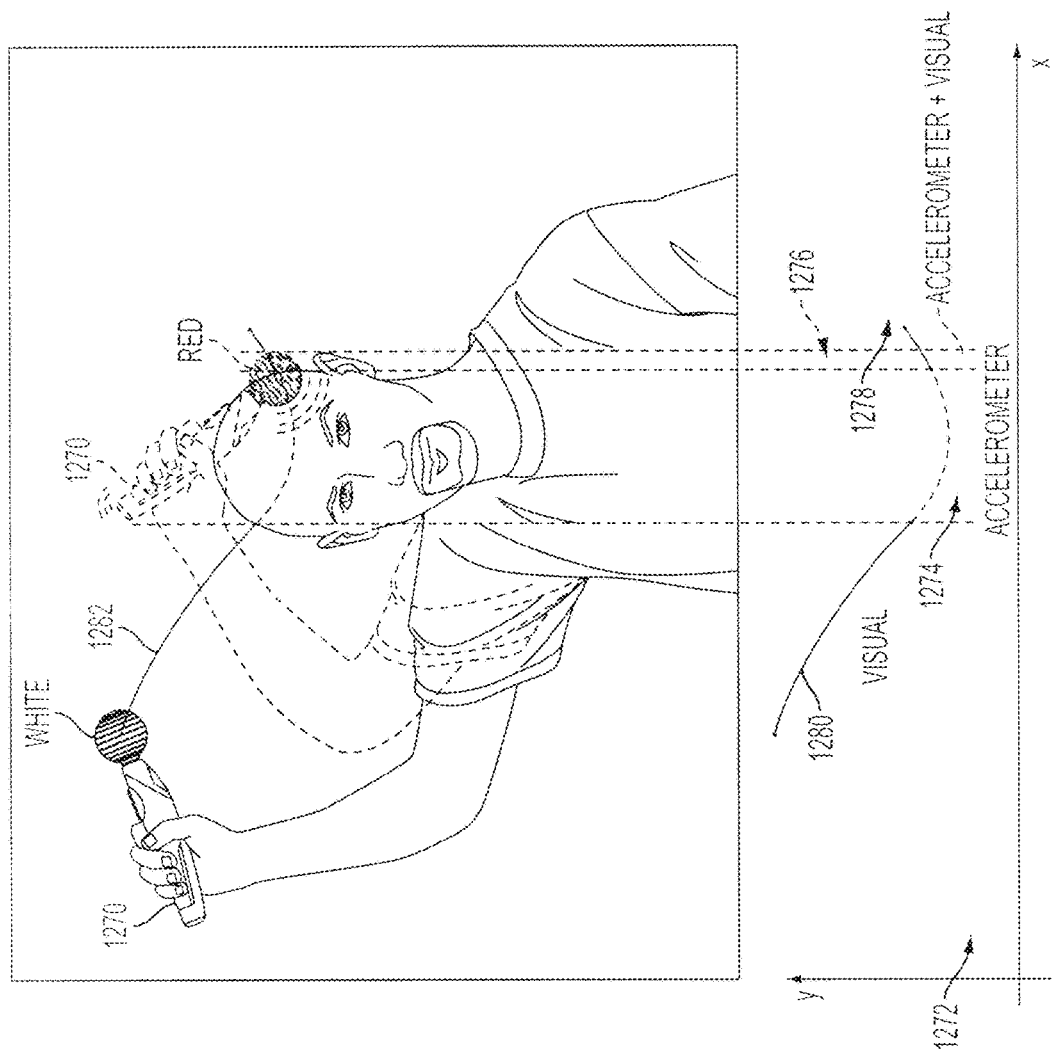
FIG. 12 depicts the generation of user feedback when the controller is occluded from the camera, in accordance with one embodiment.

FIG. 12 depicts the generation of user feedback when the controller is occluded from the camera, in accordance with one embodiment. In one embodiment, the computing system uses visual tracking of the ball in controller 1270. When the ball gets occluded, such as when the controller follows trajectory 1282 that causes occlusion when the ball is behind the player's head, the system uses dead reckoning. Dead reckoning (DR) is the process of estimating a current position based upon a previously determined position, or fix, and advancing that position based upon known speed, elapsed time, and course. Dead reckoning is used while the ball is occluded (region 1274). Once the ball is back on sight, visual tracking takes over in region 1278.

Once the ball enters occlusion region 1274, the computing based device instructs the controller to generate user feedback to inform the user. The feedback can be of different kinds, such as visual, sound, or vibrotactile. The visual feedback can include making the all light intermittently, making the ball light up in an unexpected color such as red, turning off the ball, produce a sequence of colors such as a rainbow where each color is shown for half a second, etc.

Figure 13:
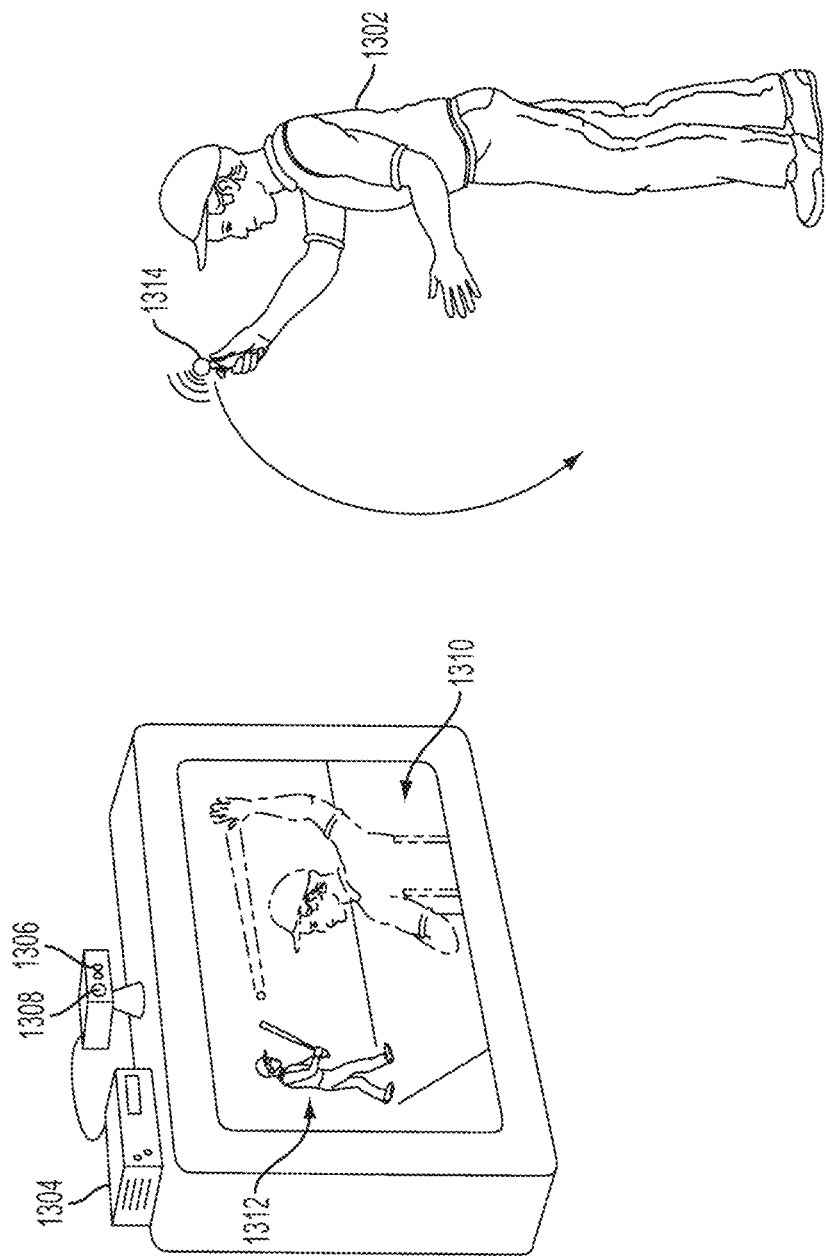
FIG. 13 illustrates combining visual and sound cues to monitor controller movement according to one embodiment.

FIG. 13 illustrates combining visual and sound cues to monitor controller movement according to one embodiment. Controller 1314 generates sound which is captured by microphones 1306 and is used by base device 1304 to track the controller's movement. The audio signals originated at the controller can be audible or inaudible and are used to track time-of-flight depth (z dimension) by processing the sounds captured by microphones 1306. The audio signals can also be used for phase-array x tracking. The audio location tracking can be combined with other forms of location tracking, such as visual tracking of the spherical section in the controller. More details on audio location tracking can be found in patent application Ser. No. 11/429,133, filed May 4, 2006, and entitled "Selective Sound Source Listening In Conjunction with Computer Interactive Processing," which is incorporated herein by reference.

In the embodiment shown in FIG. 13, player 1302 is in the process of pitching a baseball. The movement of the controller is tracked with a combination of video and sound signals to translate the pitching motion into a ball being pitched in the game shown in display 1310.

Figure 14:
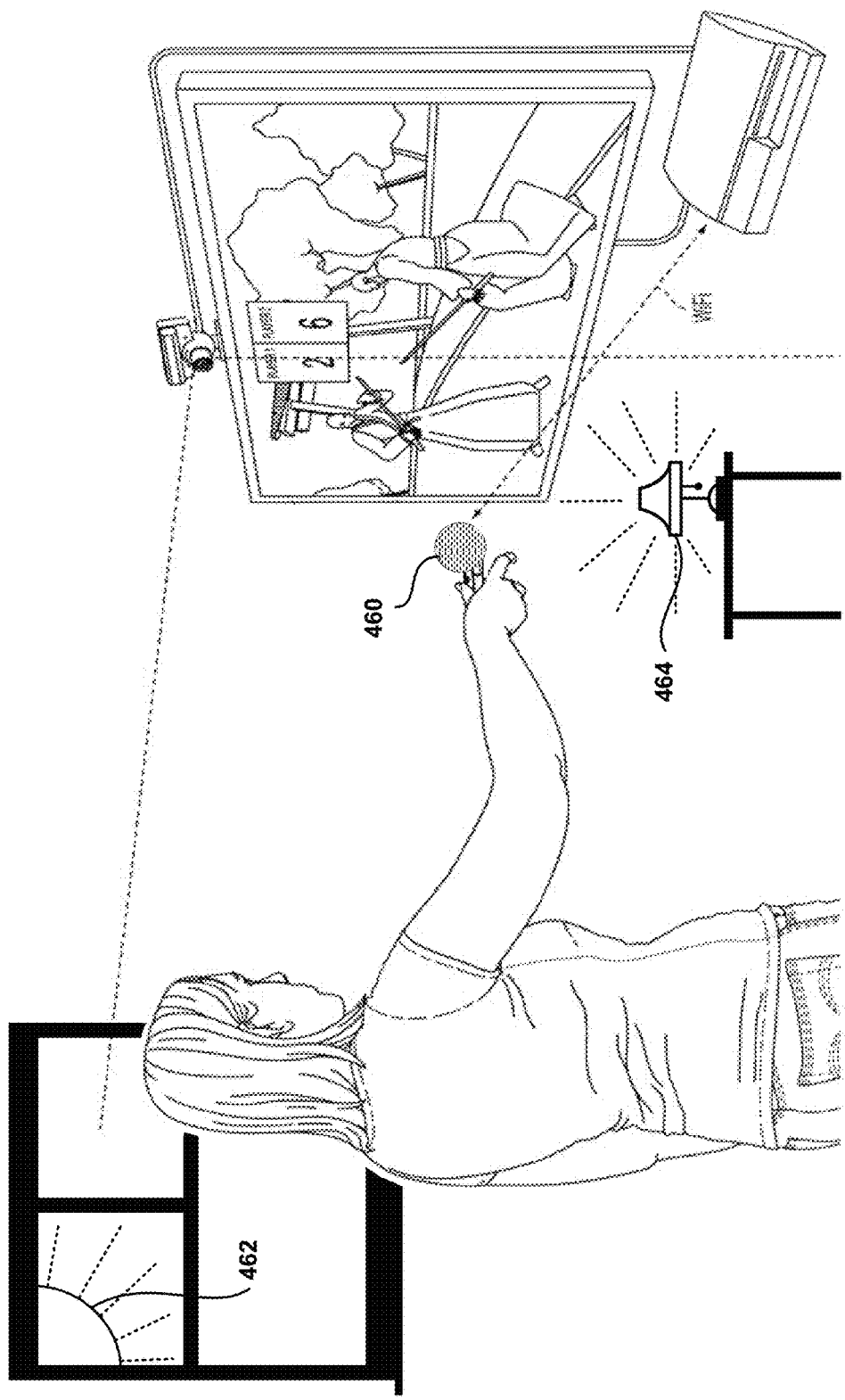
FIG. 14 depicts an embodiment for calibrating the perceived color of the ball in the controller under different lighting conditions.

FIG. 14 depicts an embodiment for calibrating the perceived color of the ball in the controller under different lighting conditions. FIG. 14 also illustrates how controller with ball 460 can change, modify or improve its appearance to improve detection depending on the lighting conditions in the field of play.

During calibration, the player aims the controller towards the camera. The base computing device sends an instruction to the controller to light up ball 460 and an image of the controller is taken by the camera. The image is then analyzed by the base computing device to assess the captured values associated with the calibration, such as color, brightness, contrast, time of the calibration, camera parameters, etc. In one embodiment, the process is repeated several times with different colors at ball 460 to gather further information on the visibility of ball 460 under different color conditions. In another embodiment, a first calibration is performed on the ball based on an overall image of the field of play. Once the ball is located within a field of play, the camera is zoomed in on the area where the ball is located and a second calibration is performed with a higher resolution of the image taken on ball 460. More details on two different calibration methods can be found below with reference to FIGS. 16D and 16E.

The calibration method described above is originated by an action by the player, but can also be automated and started by the computer program running in the base computing device. For example, a calibration can take place every time a new game is started or at periodic intervals, even while the player is engaged in a game. This allows the base station to adjust the location tracking process to accommodate changes in lighting conditions.

If the field of play is nearby a source of light (natural or artificial), such as a window that can receive light from sun 462, then visual detection may be affected depending on the time of the day or night and the amount of light in the field of play. The appearance of the ball also is affected by the angle of impact from the sun rays. For example, the appearance of the ball will be different if the sunlight hits the ball at the front, back, or side. Similarly, lamp 464 (or the like) can affect visual detection depending on whether the lamp is on or off.

In one embodiment, the computer program adjusts how the ball is illuminated according to the lighting conditions. For example, a brightly illuminated ball can improve detection in low ambient light conditions, while a darker color ball can improve detection in situations with bright light.

The calibration data from each calibration can be recorded in a database for analysis in the determination of patterns in the playing conditions and allow the computing system to adjust to a changing environment. For example, a pattern can be detected where the room receives direct sunlight on the left side of the camera field of vision from 2:00 to 3:00 PM. This information can be used to adjust how the ball is used or to provide information to the user about the difficult visual detection conditions so the user can change the environment, such as closing the window blinds in the room. Table 1 below shows sample parameters associated with a calibration and tracking database, but other parameters are also possible.

TABLE 1

| | Parameters Timestamp |
|---|---|
| Ball | color |
| | brightness |
| | coordinates (x, y, z) |
| Video | color |
| | brightness |
| | size |
| Room | background color |
| | brightness |
| | bright spots |
| | dark spots |
| Camera | zoom |
| | direction |
| | gain |

Figure 15A:
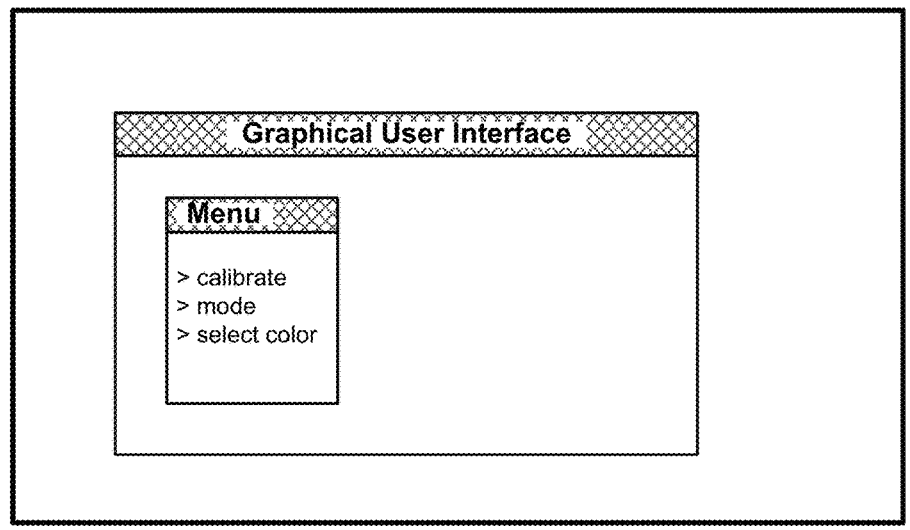
FIGS. 15A-15B illustrate using a controller for menu navigation in a display in accordance with one embodiment.
Figure 15B:
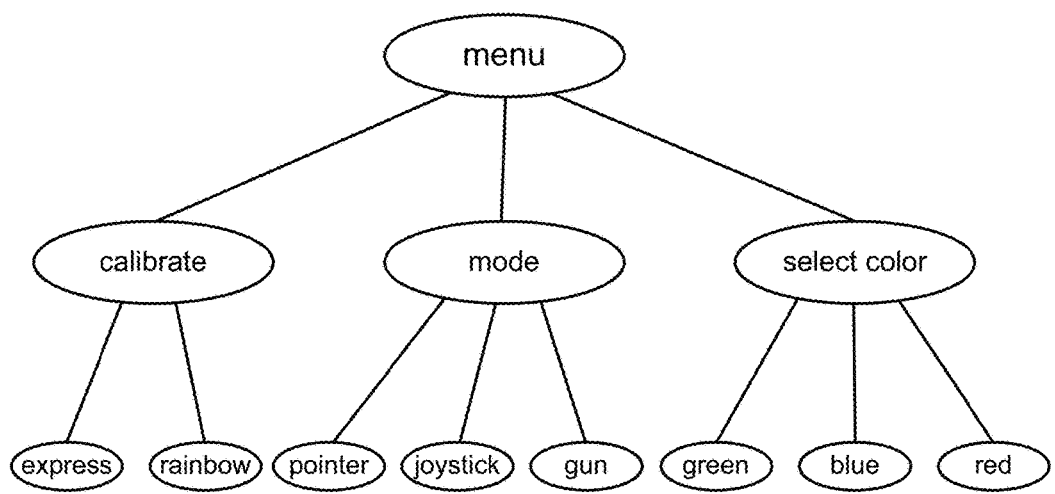

FIGS. 15A-15B illustrate using a controller for menu navigation in a display in accordance with one embodiment. FIG. 15A illustrates a display view of a Graphical User Interface for selecting program options. A wireless control device can be used as a pointer to select a desired option by pressing a selection button when the cursor is over the desired option. One embodiment for using a controller as an option is described above with reference to FIG. 7B. FIG. 15B shows an exemplary data structure in the form of a tree to represent the different menus and options within each menu. Three options are available on the top menu: calibrate, mode, and select color, used respectively for initiating a calibration procedure, setting up the controller mode of operation, and selecting a color for the ball in the controller.

Figure 16A:
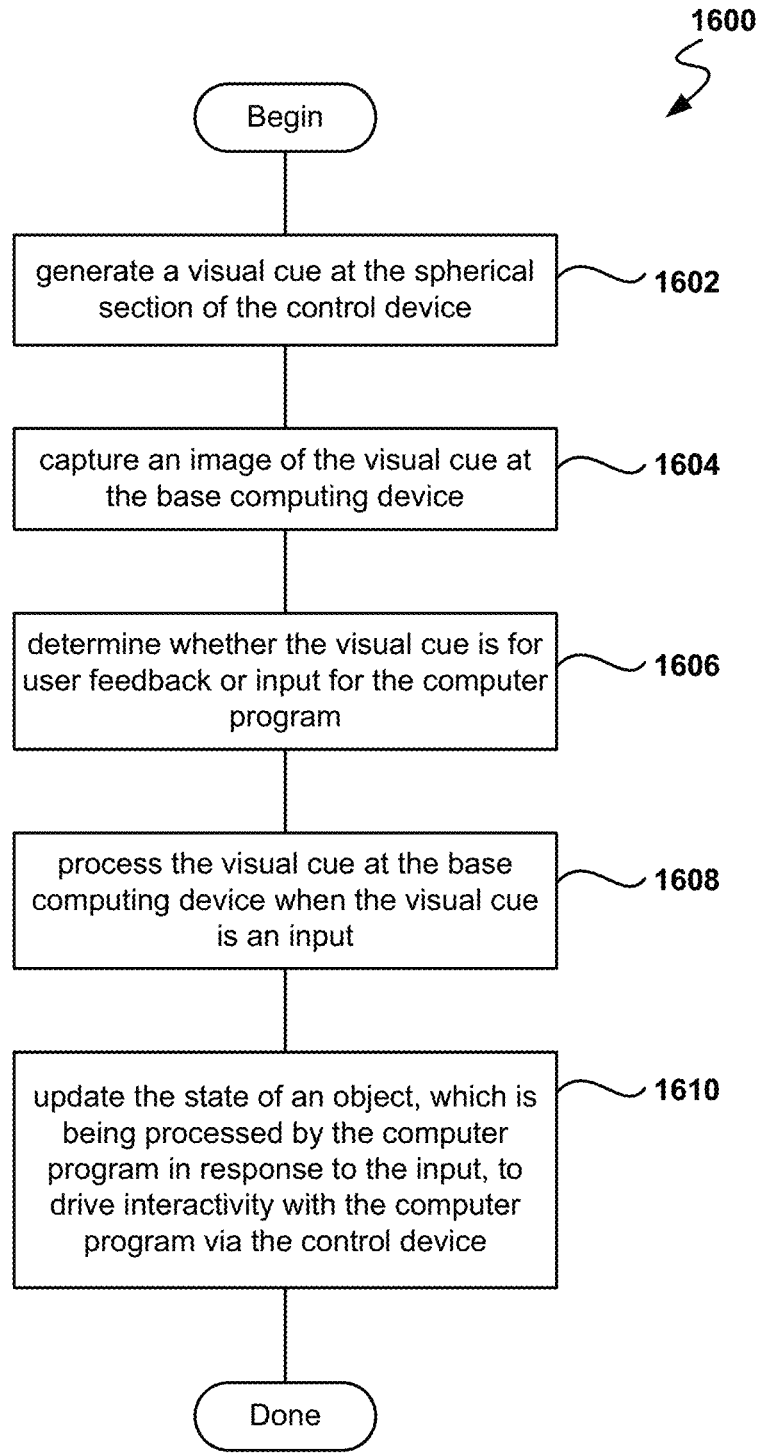
FIG. 16A-16E illustrate flow charts describing methods for different embodiments to interface a control device with a computer program executing at a base computing device.

FIG. 16A-16E illustrate flow charts describing methods for different embodiments to interface a control device with a computer program executing at a base computing device. FIG. 16A shows the flow chart of a method for interfacing a control device with a computer program executing at a base computing device. In operation 2402, the method generates a visual cue at a spherical section of the control device. One example of visual cue is lighting up the spherical section as described with reference to FIGS. 5A-D, 8, 10, 11A, etc. An image of the visual cue is captured at the base computing device in operation 2404, and a determination is made on whether the visual cue is user feedback or input for the computer program in operation 2406. If the visual cue is an input, the method processes the visual cue at the base computing device in operation 2408. In operation 2410, the method updates the state of an object being processed by the computer program in response to the input. The update of the object is used to drive interactivity with the computer program via the control device.

Figure 16B:
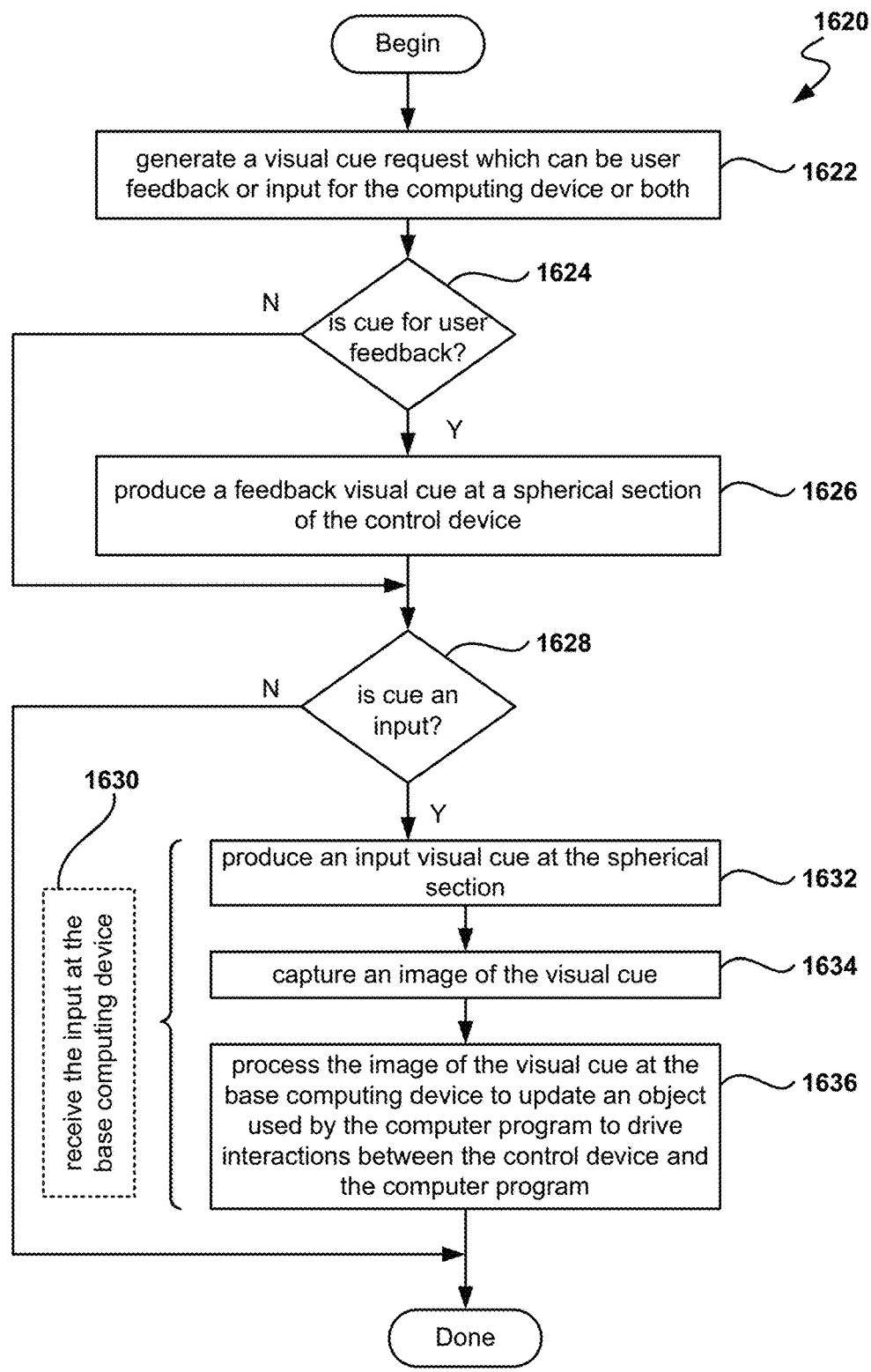

FIG. 16B illustrates a flow chart for interfacing a control device with a computer program executing at a base computing device. In operation 1622, the method generates a visual cue request, which can be user feedback or input for the computing device or both. At times, the visual cue can be used for user feedback exclusively, such as for example lighting up the ball red when a player "gets hit." The visual cue can also be used for input exclusively, such as for example lighting up several controllers with different colors that are used by the base computing device to visually track the different controllers. In some instances, the visual cue can be used for both user input and visual controller recognition. For example, the base computing device may be visually tracking a controller that is lit green and then the base computing device creates a request to provide user feedback by turning the ball red. The base computing device will then analyze images taken of the controller expecting either a green or red color. This way, the base device can keep track of the controller even when the controller changes color to provide user feedback. The different modes for visual cue processing can alternate during a session depending on the progress of the computer program.

In operation 1624, a check is performed to determine if the visual cue request is for user feedback, and if so the method continues to operation 1626 and otherwise continues to operation 1628. A feedback visual cue is produced at the spherical section of the control device in operation 1626. A second check is performed in operation 1628 to determine if the visual cue is for an input to the computing device. If the cue is for an input, then the method continues to operation 1630, which includes three different operations 1632, 1634, and 1636. If the cue is not for an input, the method ends.

In operation 1630, the method receives the input at the base computing device. An input visual cue is produced at the spherical section in operation 1632, and an image of the visual cue is captured in operation 1634. In operation 1636, the method processes the image of the visual cue at the base computing device to update an object used by the computer program to drive interactions between the control device and the computer program.

Figure 16C:
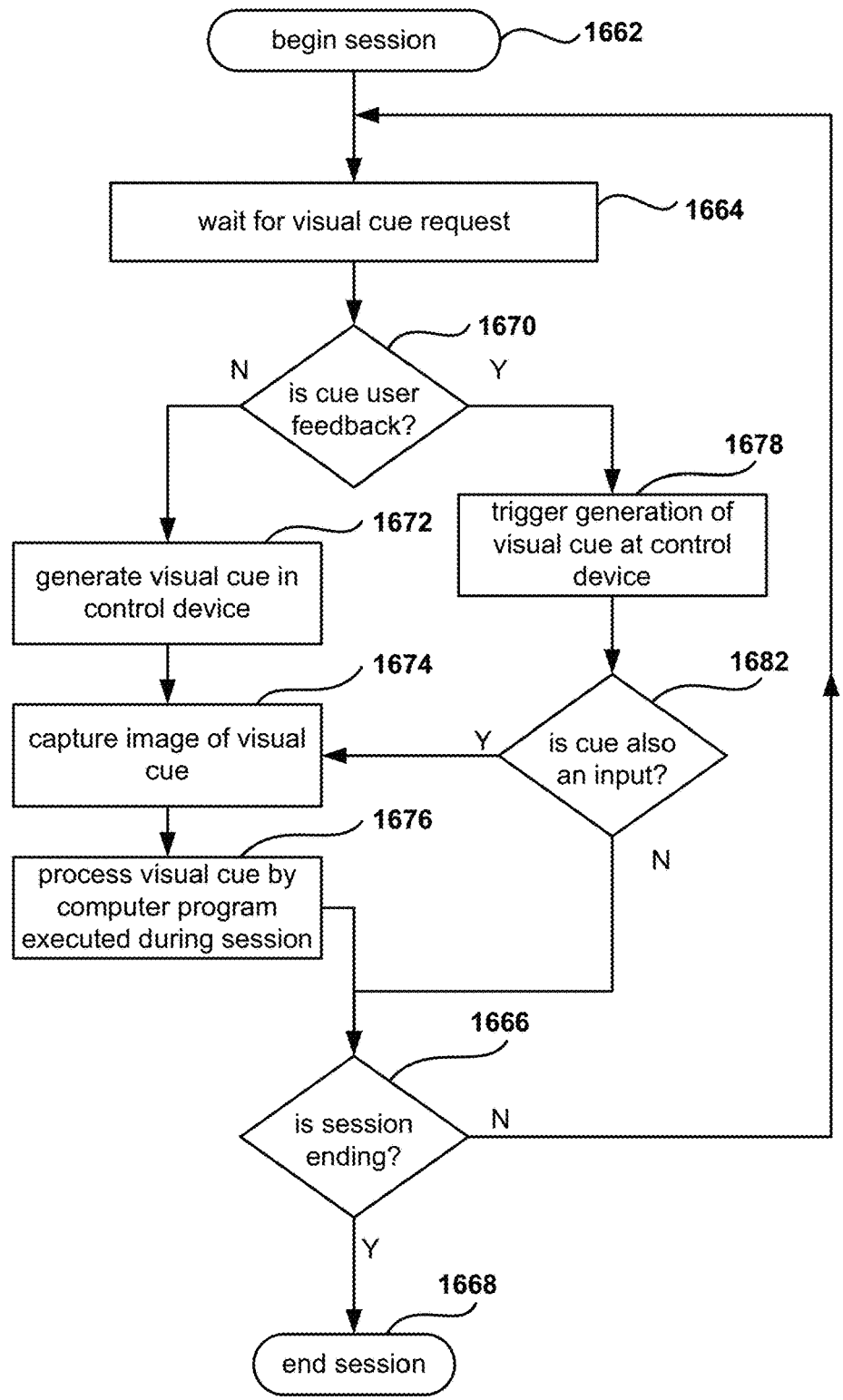

FIG. 16C depicts a flow chart for processing visual cue requests during a session. In operation 1664, the method waits for a visual cue request. Once the request is received, a check is performed to see if the request is for user feedback in operation 1670. If the request is not for user feedback, that is, the request is for an input to the computing device, the method continues to operation 1672 and to operation 1678 otherwise. In operation 1672 the visual cue is generated in the control device, and in operation 1674 the image of the visual cue is captured by the base computing device. The visual cue is processed in operation 1676 by the computer program executing during the session, and the method continues to check operation 1666 where the end of the session is detected. If the session is not ended, the method goes back to operation 1664.

In operation 1678 associated with a visual request for user feedback, the method triggers the generation of the visual cue at the control device and then the method checks if the visual cue is also an input in operation 1682. If the cue is also an input, the method continues onto operation 1674, and otherwise onto operation 1666 to check for the end of the session.

Figure 16D:
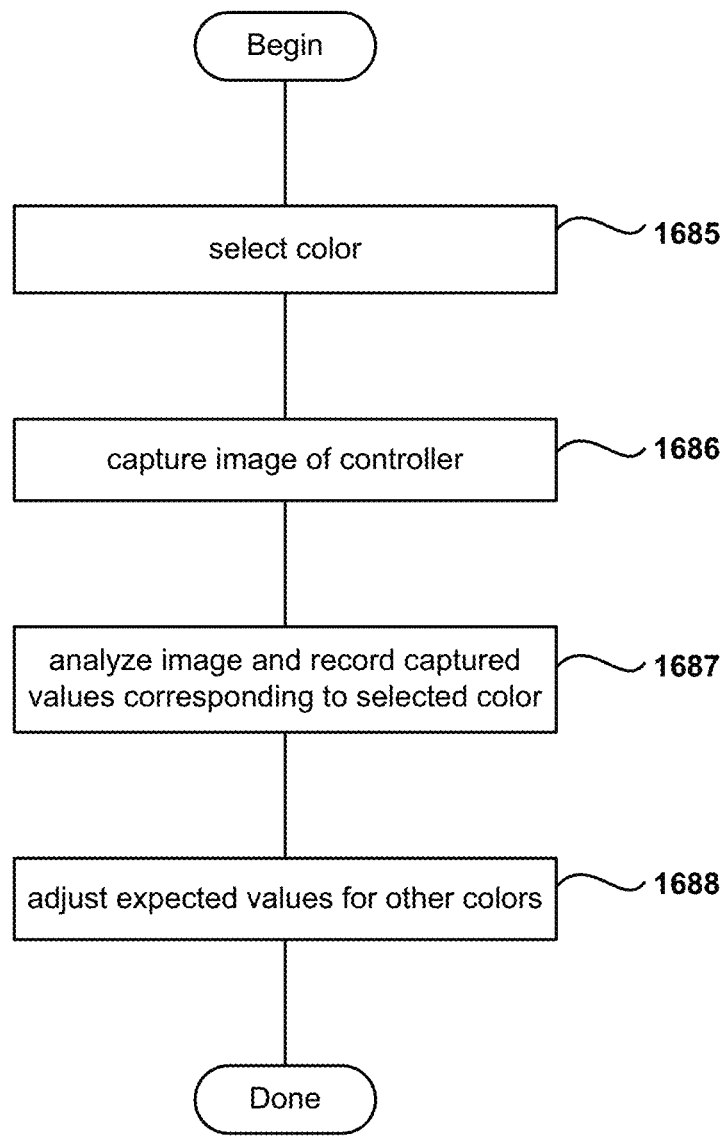

FIG. 16D illustrates a flow chart for a one-color calibration process. In operation 1685, the method selects a color for the spherical section during the calibration. In one embodiment, the user chooses the color and in another embodiment, the base computing device chooses the color. In operation 1686, an image of the controller is captured, and in operation 1687 the image is analyzed and the values captured are recorded for the color select in operation 1685. The expected values for other colors are adjusted in operation 1688 based on the analysis of the image for the selected color.

Figure 16E:
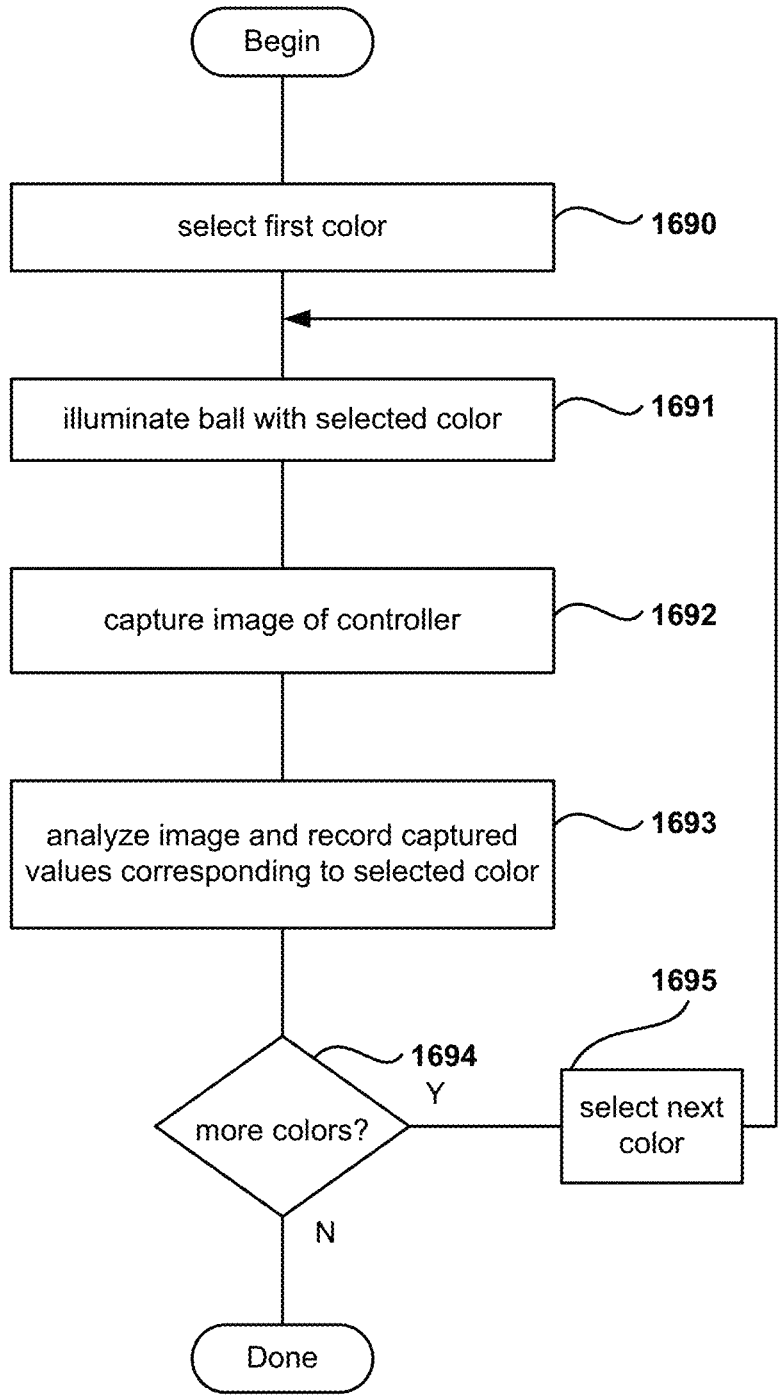

FIG. 16E illustrates a flow chart for a multi-color calibration process, similar to the method described with reference to FIG. 16D but repeating the process for several colors. In operations 1690-1692, the method selects the first color, illuminates the ball with the selected color, and captures an image of the controller, respectively.

In operation 1693, the method analyzes the image and records the captured values corresponding to the selected color. Check operation 1694 determines if there are more colors for the calibration, and if so, the method continues to operation 1695 where the next color is selected, and then back to operation 1691.

Note that the above procedures described with reference to FIGS. 16D and 16E are exemplary and many modifications thereto, including reordering some elements and/or performing some operations in parallel, would occur to a person of ordinary skill in the art, and is well within the scope of the invention.

Figure 17:
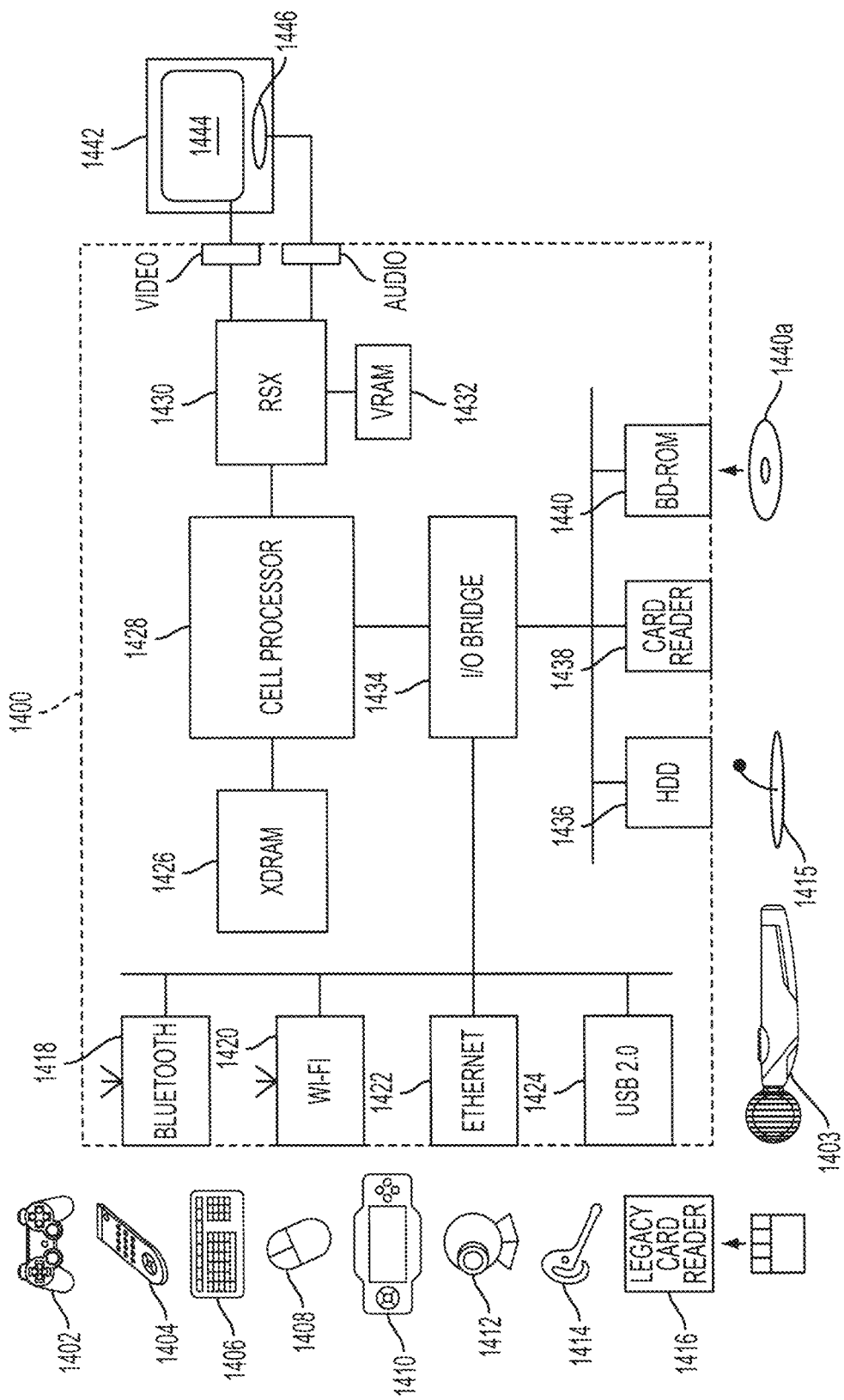
FIG. 17 illustrates hardware and user interfaces that may be used to determine controller location, in accordance with one embodiment of the present invention.

FIG. 17 illustrates hardware and user interfaces that may be used to determine controller location, in accordance with one embodiment of the present invention. FIG. 17 schematically illustrates the overall system architecture of the Sony® Playstation 3® entertainment device, a console that may be compatible for interfacing a control device with a computer program executing at a base computing device in accordance with embodiments of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 18:
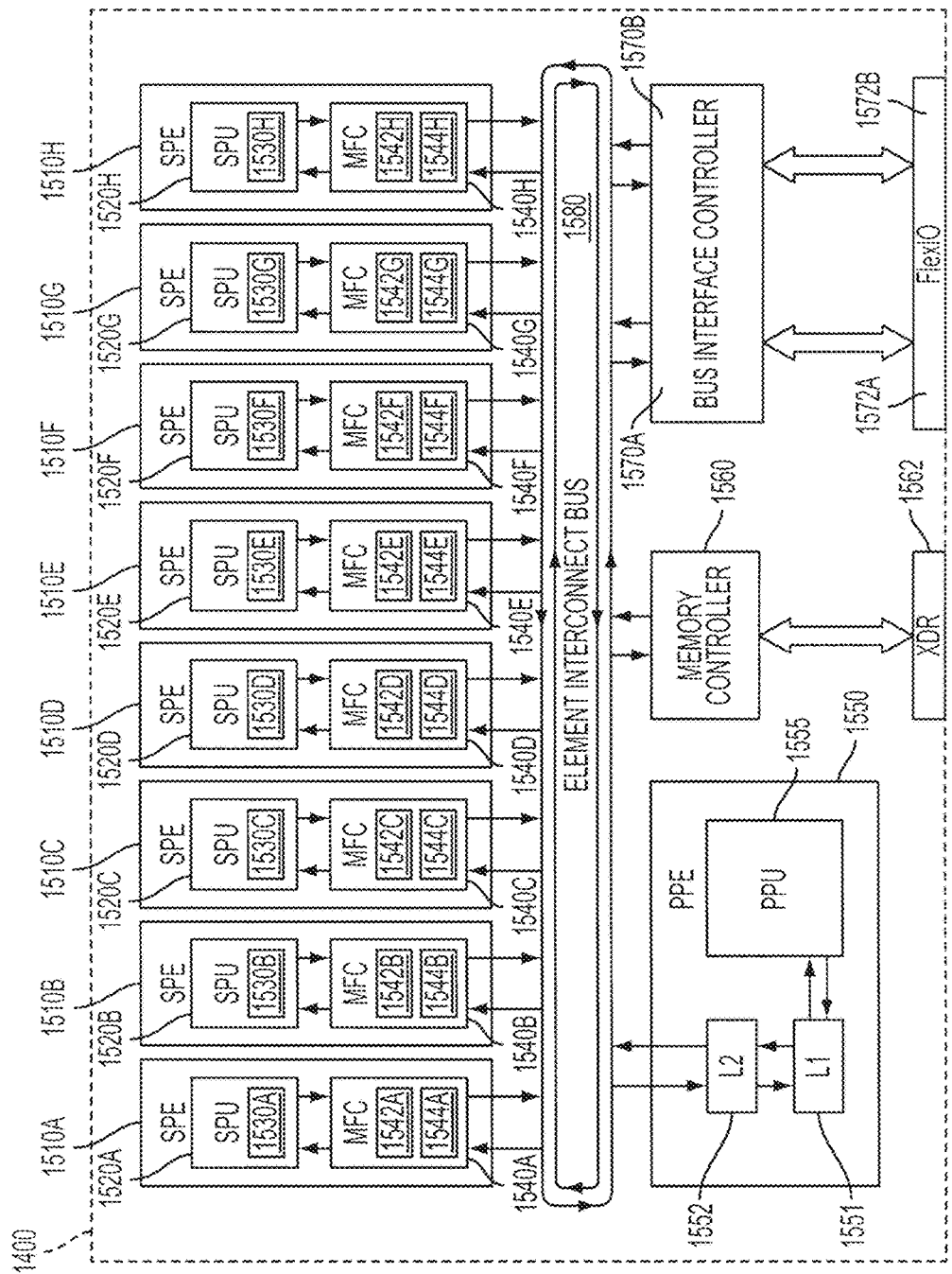
FIG. 18 illustrates additional hardware that may be used to process instructions, in accordance with one embodiment of the present invention.

FIG. 18 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Figure 19:
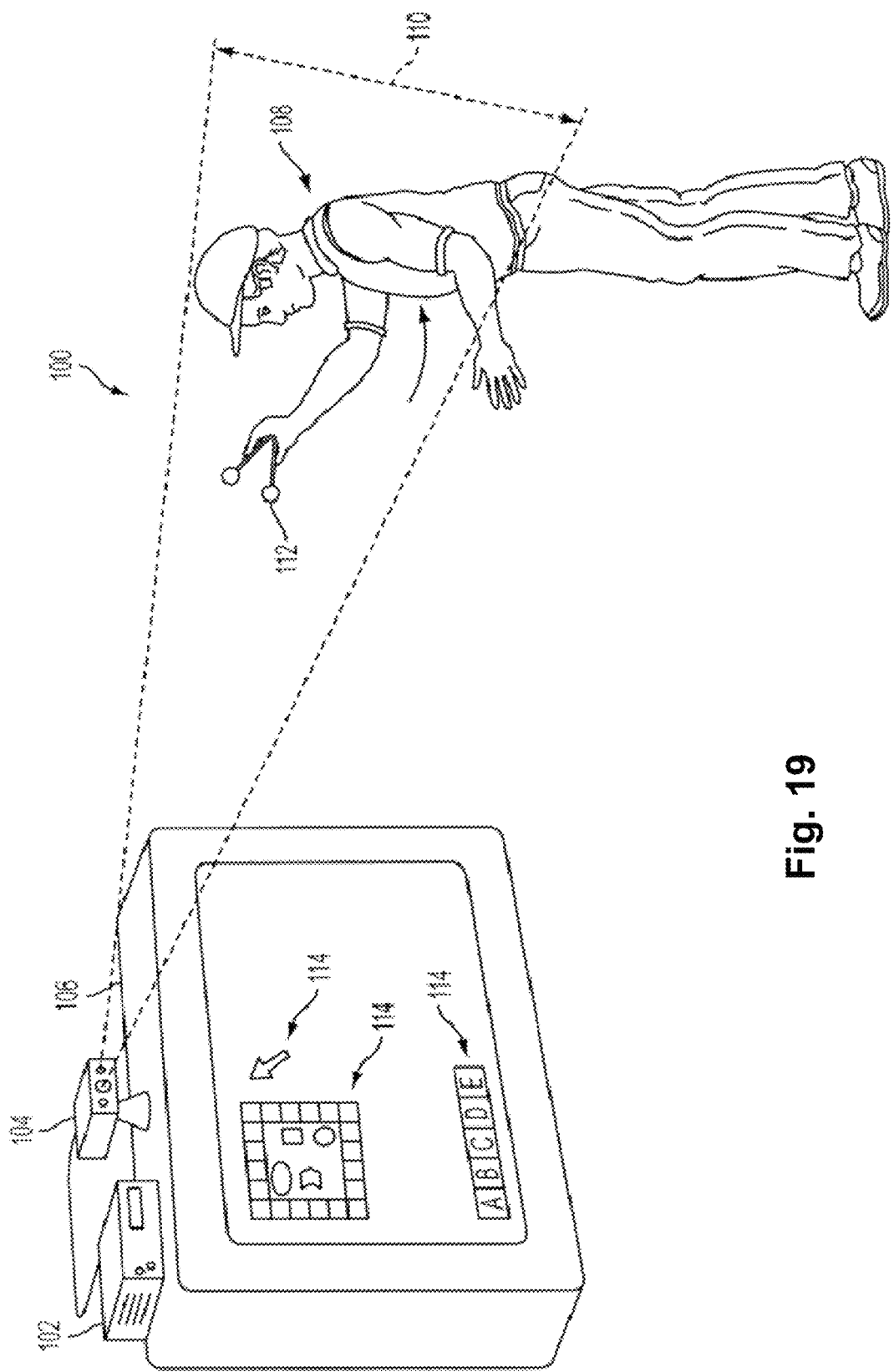
FIG. 19 is a high level schematic diagram of an overall system configuration capable of tracking an interface object, in accordance with one embodiment of the present invention.

FIG. 19 is a high level schematic diagram of an overall system configuration capable of tracking an interface object, in accordance with one embodiment of the present invention. Game interface system 100 includes computing system 102 in communication with image capture device 104 and display 106. Computing system 102 may include any computer device (i.e., device having a processor and memory) that is capable of executing code and interfacing with image capture device 104. Exemplary computing system 102 includes a computer, a digital video disc (DVD) player, a smart appliance, a game console such as the Sony Playstation 2, Sony Playstation 3 (N), other brand game or general purpose computing systems, etc. Computing system 102 would then be capable of executing a program that allows user 108 to interface with graphics of the program.

Image capture device 104 may be a video capturing device that enables frames of images within field of view 110 to be captured and digitized before being transferred to computing system 102. An example of image capture device 104 may be a web cam type video capture device that captures and digitizes images into a number of frames as the images are transferred to computing system 102. Additionally, image capture device 104 may be an analog-type video capture device that continuously captures raw video and then transfers the raw video to computing system 102, whereby the computing system digitizes the raw video into frames.

As shown in FIG. 19, image capture device 104 is designed to capture movement of interface object 112 to enable interaction with a program, such as a video game, executed on computing system 102. For instance, user 108 may utilize movement of interface object 112 to enable interaction with the program. Specifically, in one embodiment, user 108 holds interface object 112 that includes a pair of spherical objects connected by a handle. As will be explained in more detail below, user 108 can move the pair of spherical objects relative to each other by applying pressure to squeeze the two spherical objects together. As user 108 moves interface object 112 into field of view 110 of image capture device 104, the image capture device captures the physical features of the interface object such as size, shape, and color. User 108 can then move the spherical objects of interface object 112 relative to each other or relative to image capture device 104 with his hand (or any part of his body) to cause interaction with the program.

After image capture device 104 captures the physical features of interface object 112, computing system 102 may calculate a two or three dimensional description of the interface object, including its position and orientation in two or three dimensional space, and this description is correspondingly stored in a memory of the computing system. As user 108 changes the position and/or orientation of interface object 112, the description of the interface object in memory, and a corresponding rendering of the interface object in the rendering area of image memory, are continuously updated in order to interface with program executed on computing system 102 and displayed on display 106. For example, as shown in FIG. 19, the movement of interface object 112 triggers an interfacing command allowing user 108 to manipulate objects 114 (e.g., cursors, drawings, windows, menus, etc.) of program. In one example, the movement of interface object 112 allows for clicking and dragging functionality similar to a mouse. That is, by squeezing and/or moving interface object 112, user 108 can move or manipulate objects 114 displayed on display 106.

Figure 20:
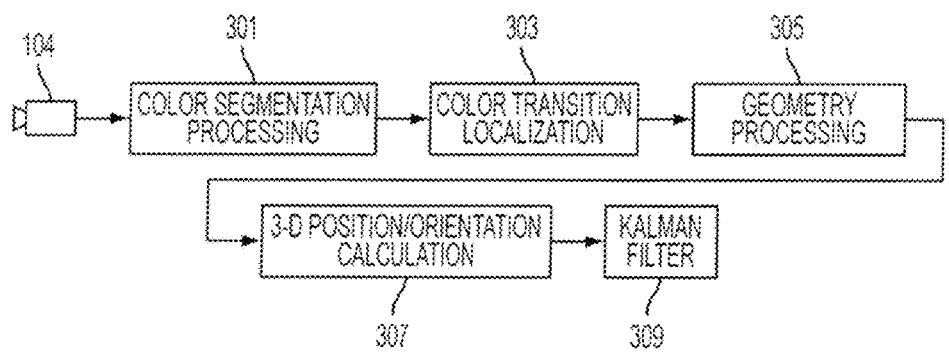
FIG. 20 is a block diagram showing the functional blocks used to track and discriminate a pixel group corresponding to the interface object as the interface object is being manipulated by the user, in accordance with one embodiment of the invention.

FIG. 20 is a block diagram showing the functional blocks used to track and discriminate a pixel group corresponding to the interface object as the interface object is being manipulated by the user, in accordance with one embodiment of the invention. It shall be understood that the functions depicted by the blocks are implemented by software which is executed by the MPU in computing system. Moreover, not all of the functions indicted by the blocks in FIG. 20 are used for each embodiment.

Initially, the pixel data input from image capture device 104 is supplied to computing system through input/output port interface, enabling the following processes to be performed thereon. First, as each pixel of the image is sampled, for example, on a raster basis, a color segmentation processing operation 301 is performed, whereby the color of each pixel is determined and the image is divided into various two-dimensional segments of different colors. Next, for certain embodiments, a color transition localization operation 303 is performed, whereby regions where segments of different colors adjoin are more specifically determined, thereby defining the locations of the image in which distinct color transitions occur. Then, an operation for geometry processing 305 is performed which, depending on the embodiment, comprises either an edge detection process or performing calculations for area statistics, to thereby define in algebraic or geometric terms the lines, curves and/or polygons corresponding to the edges of the object of interest. For example, with the embodiment of the interface object shown in FIG. 19, the pixel area will comprise two generally circular shapes corresponding to an orthogonal frontal view of the interface object. From the algebraic or geometric description of the circular shapes, it is possible to define the centers, radiuses, and orientations of the pixel group corresponding to the interface object.

Returning to FIG. 20, the three-dimensional position and orientation of the object are calculated in operation 307, according to algorithms which are to be described in association with the subsequent descriptions of preferred embodiments of the present invention. The data of three-dimensional position and orientation also undergoes processing operation 309 for Kalman filtering to improve performance Such processing is performed to estimate where the object is going to be at a point in time, and to reject spurious measurements that could not be possible, and therefore are considered to lie outside the true data set. Another reason for Kalman filtering is that image capture device 104 produces images at 30 Hz, whereas the typical display runs at 60 Hz, so Kalman filtering fills the gaps in the data used for controlling action in the game program. Smoothing of discrete data via Kalman filtering is well known in the field of computer vision and hence will not be elaborated on further.

Figure 21:
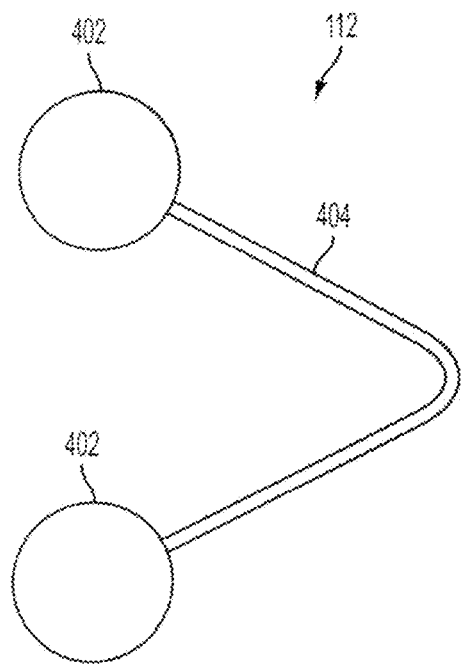
FIG. 21 is a schematic diagram of a more detailed view of the interface object shown in FIG. 19, in accordance with one embodiment of the present invention.

FIG. 21 is a schematic diagram of a more detailed view of the interface object shown in FIG. 19, in accordance with one embodiment of the present invention. As shown in FIG. 21, interface object 112 includes a pair of spherical objects 402 coupled together by handle 404. Each spherical object 402 has a ball-shaped body, and the body may be solid or hollow. Spherical objects 402 can be any suitable material. Exemplary materials include plastic, wood, ceramic, metal, etc. Further, surface of spherical objects 402 may have any suitable color or pattern. For example, spherical objects 402 may have a white color that contrasts clearly with a dark background such that the spherical objects can be easily identified. Additionally, surface of spherical objects 402 may have a pattern such that the image capture device can capture the orientation of the pattern for a computing system to determine the orientation of the spherical objects relative to the image capture device.

Figure 22:
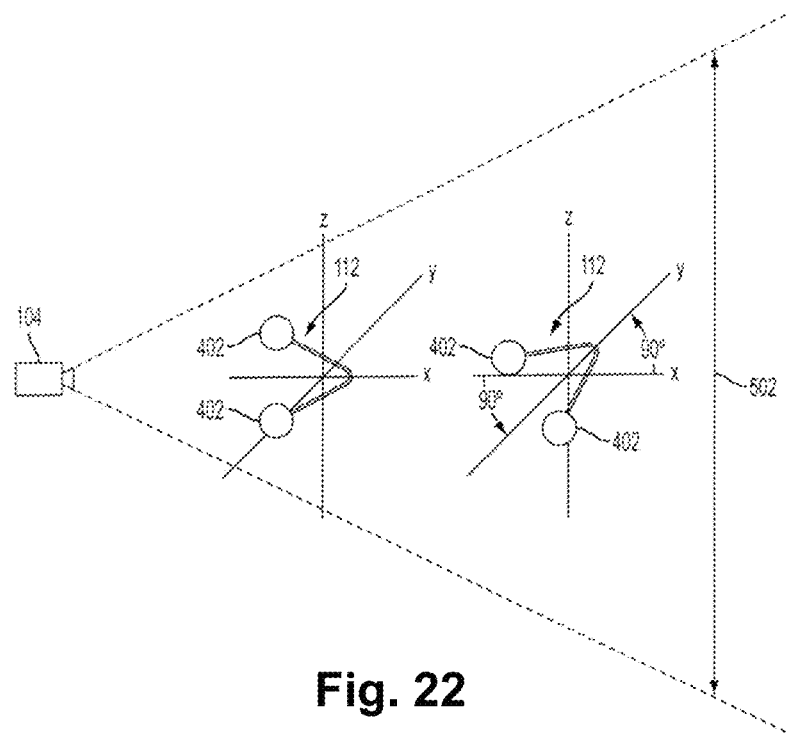
FIG. 22 is a schematic diagram of the interface object shown in FIG. 21 placed within field of view of an image capture device, in accordance with one embodiment of the present invention.

FIG. 22 is a schematic diagram of the interface object shown in FIG. 21 placed within field of view of an image capture device, in accordance with one embodiment of the present invention. As shown in FIG. 22, interface object 112 is placed within field of view 502 of image capture device 104. Interface object 112 may move and/or rotate in X, Y, and Z directions. As long as interface object 112 is within field of view 502, image capture device 104 detects the circular shapes of pair of spherical objects 402 at substantially any direction and angle. In other words, since each object 402 is spherical, the spherical object has a circular shape when viewed from any direction and angle along the X, Y, and Z axis. For example, as shown in FIG. 22, image capture device 104 detects two generally circular shapes corresponding to an orthogonal frontal view of interface object 112, where pair of spherical objects 402 are aligned vertically along the X, Z plane. As shown in FIG. 22, when interface object 112 is rotated clockwise by ninety degrees along the X, Y plane, image capture device 104 still detects two generally circular shapes. Since the shapes of spherical objects 402 are not distorted when viewed from different directions and angles, interface object 112 may simply be tracked by detecting two circular shapes.

However, the object is not limited to a sphere, but may have any suitable shape. For example, the object also may be a cube. Other exemplary shapes of the object include a dome, a half sphere, a pyramid, a half cube, etc. The surface of object may have any suitable color or pattern. For example, the object may have a black color that contrasts clearly with a white background such that the object can be easily identified. In one embodiment, the color of the object can change. Additionally, surface of the object may have patterns such that the orientation of the patterns may be detected to determine the orientation of the object relative to the image capture device. The patterns may be any suitable shapes, colors, and sizes.

Figure 23:
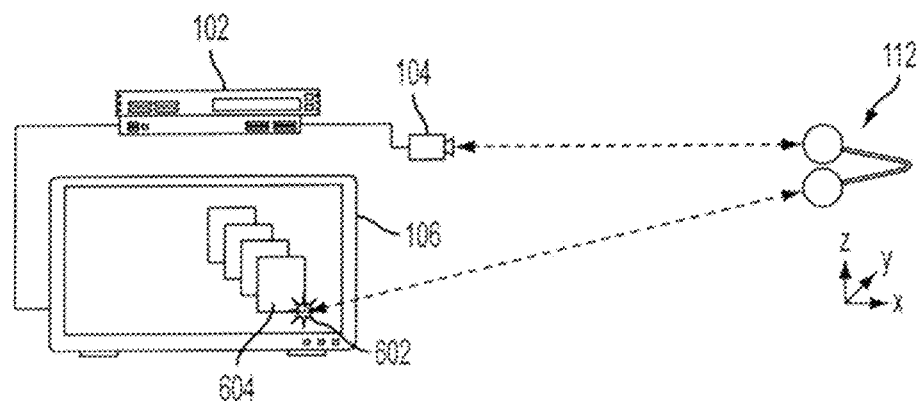
FIG. 23 is a schematic diagram of a system for triggering commands of a program executed on a computing system using the interface object shown in FIG. 21, in accordance with one embodiment of the invention.

FIG. 23 is a schematic diagram of a system for triggering commands of a program executed on a computing system using the interface object shown in FIG. 21, in accordance with one embodiment of the invention. As shown in FIG. 23 image capture device 104 is in communication with computing system 102 which in turn is in communication with display 106. When interface object 112 is provided within field of view of image capture device 104, the image capture device detects the interface object. Interface object 112 is configured to be tracked in the X, Y, and Z directions and enabled to trigger an event of a program executed on computing system 102. Interface object 112 may be tracked through color and/or circular shape as described above. That is, interface object 112 may have a distinct color and distinct circular shape capable of being detected when in the field of view of image capture device 104. In one embodiment, interface object 112 can fit inside the palm of a hand. Thus, with the application of pressure on interface object 112, the pair of spherical objects of the interface object move toward each other from opposite directions along the X, Z plane, and such change in position is detected by image capture device 104. Conversely, image capture device 104 may also detect the spherical objects moving away from each other in opposite directions along the X, Z plane when pressure is released. Additionally, the hand may move interface object 112 along any X, Y, and Z direction relative to image capture device 104. For instance, to detect a change in position of interface object 112 along the X direction, sizes of spherical objects of the interface object captured by image capture device 104 may be compared with pre-programmed reference sizes to determine a distance of the interface object relative to the image capture device. These detected changes in positions are communicated to computing system 102, which in turn result in interfacing commands being triggered on the program executed on the computing system and displayed on display 106. For example, interface object 112 can be used similar to a mouse such that an object of a program such as image 604 or point 602 displayed on display 106 can be selected, accessed and moved around.

In one embodiment, image 604 can be grabbed at point 602 and dragged or manipulated as desired. One skilled in the art will appreciate that any number of suitable operations can be performed, wherein interface object 112 is capable of accomplishing similar functionality as a mouse. Of course, interface object 112 can be used to play a video game or any other suitable interactive game where mouse-like functionality is required. In one embodiment, the relative movements between the spherical objects of interface object 112 trigger interfacing commands comparable to a mouse click which cause objects, such as image 604 and point 602, displayed on display 106 to be selected. Additionally, the change in position of interface object 112 in the X, Y, and Z directions relative to image capture device 104 can cause the objects displayed on display 106 to be moved. For instance, moving interface object 112 causes image 604 to be moved on display 106. One skilled in the art will appreciate that there are an abundance of applications in which the mouse-like functionality described herein can be applied.

Figure 24A:
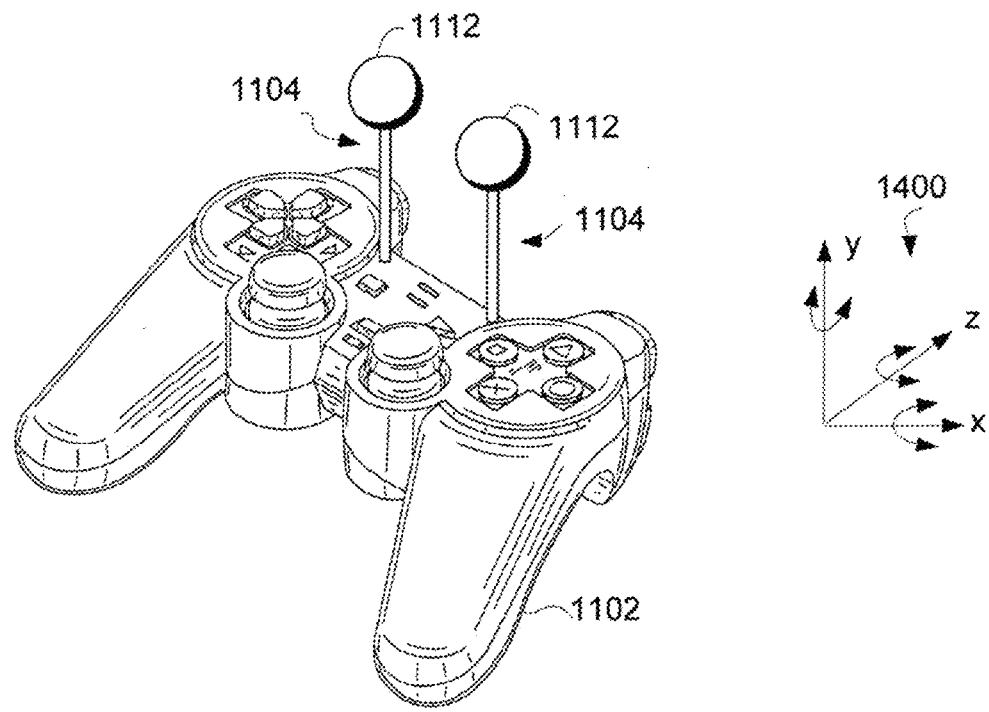
FIGS. 24A-24C illustrate alternate examples for connecting one or more interface objects to a controller, in accordance with one embodiment of the invention.
Figure 24B:
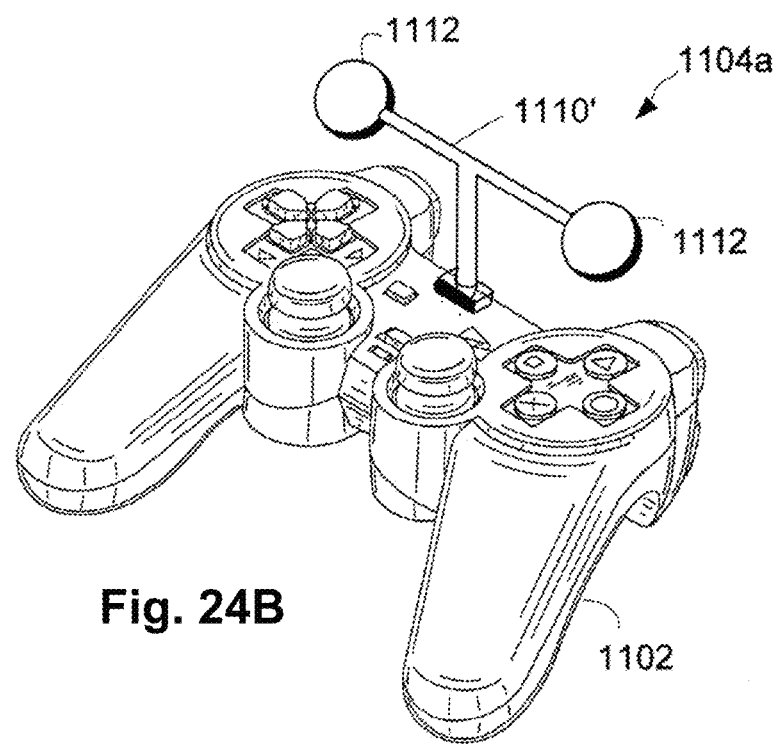

FIG. 24A illustrates a controller 1102 in which interface objects 1104 can be connected to different sections of the body of the controller 1102. In this example, by having two interface objects 1104, it is possible for the computing device 102 to determine spatial positions 1400. Examples of spatial positions 1400 may include tilts, rolls and yaw, as may be used in the aforementioned flight simulation program. The connection of the posts 1110 to the controller 1102 may be by way of USB connections, or other connections that enable either one or more of electrical lines, wiring, sound, light or general transmission of signals. In the example of FIG. 24B, an interface object 1114*a* is provided, with a cross-post 1110' configuration. As shown, the cross-post 1110' is able to connect to two objects 1112. The cross-post 1110' is only one example, and other post configurations are possible.

Figure 24C:
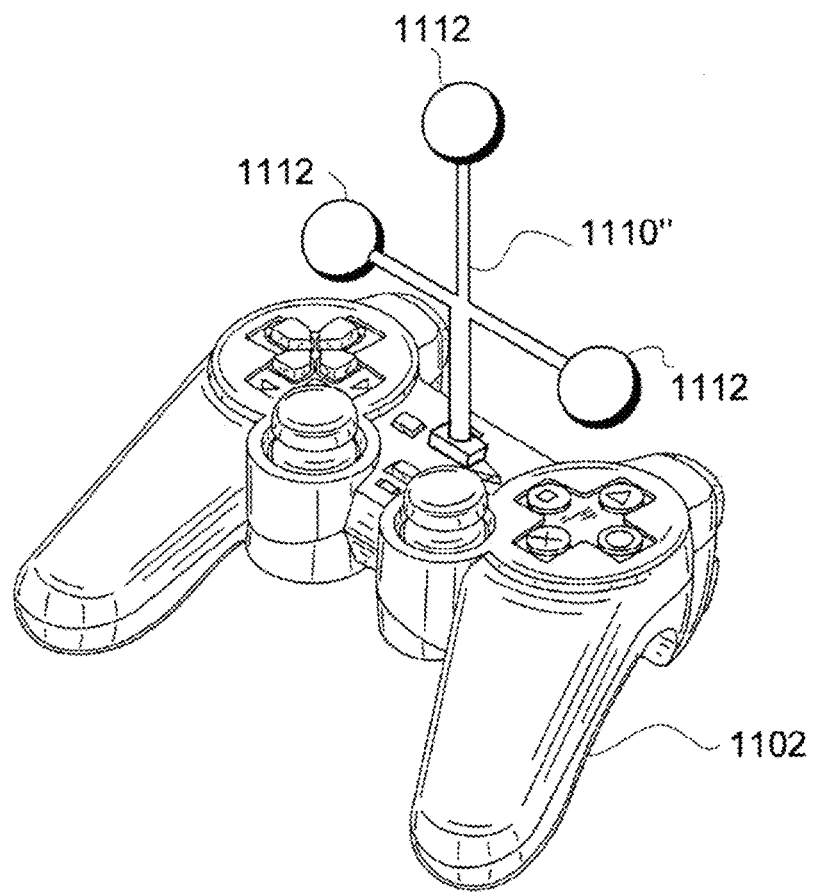

FIG. 24C illustrates another such configuration of the post. For instance, in FIG. 24C, the post 1110" provides a full cross configuration. The object 1112 can therefore interface through the posts and can provide the additional positioning information mentioned above.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller comprising:
   a handle;
   a visual tracking section connected to the handle, the visual tracking section having a shape that includes one or more light emitting devices;
   inertial sensors being part of the controller;
   a wireless transceiver being part of the controller, wherein the controller is operable to wirelessly transmit inertial sensor information from the inertial sensors to a computing device, wherein the computing device uses the inertial sensor information and images captured of the visual tracking section to define input for an application executed by the computing device, the input used as interactive input used by the application, the application is configured to output display data to a screen; and
   a vibration device being part of the controller, the vibration device is configured activate to provide vibrotactile feedback responsive to said interactive input processed by the application.

2. The controller of claim 1, wherein the light emitting devices illuminate on the shape a pattern for the visual tracking section, the pattern is defined as an arc of a ring shape.

3. The controller of claim 2, wherein the light emitting devices produce light in one of an infrared or visible spectrum.

4. The controller of claim 1, further comprising,
   a plurality of buttons, where each button is configured for providing a command to the application that is executed by the computing device.

5. The controller of claim 1, further comprising,
   a joystick, where the joystick is configured for providing a command to the application that is executed by the computing device.

6. The controller of claim 1, wherein wireless transceiver is configured to communicate data in accordance with one of a radio signal, a WiFi signal, or a Bluetooth signal.

7. The controller as recited in claim 1, wherein the inertial sensors include an accelerometer for measuring acceleration and gravity forces on the controller.

8. The controller as recited in claim 1, wherein the inertial sensors include a magnetometer.

9. The controller as recited in claim 1, wherein the inertial sensors include an accelerometer and a magnetometer used together to obtain an inclination and an azimuth of the controller.

10. The controller as recited in claim 1, wherein the inertial sensors include a gyroscope for measuring orientation of the controller.

11. The controller as recited in claim 1, wherein the computing device monitors visual cues produced by the visual tracking section.

12. The controller as recited in claim 1, wherein the computing device determines an orientation of the controller to enable use of the controller as one of a pointing device, a selection device, or input device.

13. The controller as recited in claim 1, further including:
    one or more speakers for providing audio feedback.

14. The controller of claim 1, wherein the visual tracking section is configured to be illuminated in different colors, or levels of brightness, or intermittently.

15. The controller as recited in claim 1, wherein the inertial sensors include an accelerometer for measuring acceleration and gravity forces on the controller and/or a magnetometer.

16. A controller comprising:
 a handle;
 a visual tracking section integrated with the handle, the visual tracking section having a shape that includes one or more light emitting devices that are viewable from a surface of the visual tracking section;
 inertial sensors being part of the controller; and
 a wireless transceiver being part of the controller, wherein the controller is operable to wirelessly transmit inertial sensor information from the inertial sensors to a computing device, wherein the computing device uses the inertial sensor information and one or more video images captured of the visual tracking section to provide input for an application executed by the computing device, the input used as interactive input by the application, the application is configured to output display data to a screen, the screen provides graphical content and at least some of the graphical content changes responsive to the interactive input;
 wherein the light emitting devices illuminate a pattern on the visual tracking section, and the pattern is arranged along an arc.

17. The controller of claim 16, wherein the light emitting devices produce light in one of an infrared or visible spectrum.

18. The controller of claim 16, further comprising,
 a vibration device being part of the controller, the vibration device is configured activate to provide vibrotactile feedback responsive to certain interactive input processed by the application.

19. The controller of claim 16, further comprising,
 a plurality of buttons, where each button is configured for providing a command to the application that is executed by the computing device, and or a joystick, where the joystick is configured for providing a command to the application that is executed by the computing device.

20. The controller of claim 16, wherein wireless transceiver is configured to communicate data in accordance with one of a radio signal, a WiFi signal, or a Bluetooth signal.

* * * * *